United States Patent [19]
Uesaka et al.

[11] Patent Number: 6,044,157
[45] Date of Patent: Mar. 28, 2000

[54] MICROPROCESSOR SUITABLE FOR REPRODUCING AV DATA WHILE PROTECTING THE AV DATA FROM ILLEGAL COPY AND IMAGE INFORMATION PROCESSING SYSTEM USING THE MICROPROCESSOR

[75] Inventors: Yasushi Uesaka, Sanda; Kazuhiko Yamauchi; Masayuki Kozuka, both of Neyagawa; Nobuo Higaki, Osaka; Koichi Horiuchi, Hirakata; Syusuke Haruna, Itami, all of Japan

[73] Assignee: Matsushita Electric Industrial Co., Ltd., Osaka, Japan

[21] Appl. No.: 08/815,404

[22] Filed: Mar. 10, 1997

[30] Foreign Application Priority Data

| Mar. 8, 1996 | [JP] | Japan | 8-051247 |
| Jun. 5, 1996 | [JP] | Japan | 8-142507 |
| Oct. 2, 1996 | [JP] | Japan | 8-261524 |

[51] Int. Cl.[7] .................................................. H04N 7/167
[52] U.S. Cl. .......................... 380/201; 713/189; 713/190; 380/217
[58] Field of Search ........................ 380/20, 4, 5, 201, 380/200, 203, 217, 239; 712/32, 36; 713/189, 193, 200, 190

[56] References Cited

U.S. PATENT DOCUMENTS

| 5,357,614 | 10/1994 | Pattisam et al. | 395/250 |
| 5,386,469 | 1/1995 | Yearsley et al. | 380/3 |
| 5,576,765 | 11/1996 | Cheney et al. | 348/407 |
| 5,598,483 | 1/1997 | Purcell et al. | 382/232 |
| 5,621,794 | 4/1997 | Matsuda et al. | 380/20 |
| 5,668,873 | 9/1997 | Yamauchi | 380/5 |
| 5,742,785 | 4/1998 | Stone et al. | 395/393 |
| 5,815,646 | 9/1998 | Purcell et al. | 395/163 |
| 5,825,878 | 10/1998 | Takahashi et al. | 380/4 |
| 5,825,879 | 10/1998 | Davis | 380/5 |
| 5,848,154 | 12/1998 | Nishio et al. | 380/4 |

FOREIGN PATENT DOCUMENTS 6124539  5/1994  Japan .

Primary Examiner—Gilberto Barrón, Jr.
Assistant Examiner—Trevor Quick Coddington
Attorney, Agent, or Firm—Price, Gess & Ubell

[57] ABSTRACT

A microprocessor used in an image information processing system is provided. The microprocessor includes: decryption unit 59 for decrypting the encrypted compressed AV data; IDCT unit 58 for performing an inverse DCT to decompress the decrypted compressed AV data; and microprogram memory 54 for storing microprograms for executing the AV data reproduction instruction which performs decryption and decompression of the encrypted compressed AV data inseparably by using the decryption unit 59 and IDCT unit 58.

13 Claims, 26 Drawing Sheets

| INSTRUCTION | PRIVILEGE LEVEL |
|---|---|
| ⋮ | ⋮ |
| move | 0 |
| add | 0 |
| stop | 1 |
| reset | 1 |
| ⋮ | ⋮ |
| seek | 0 |
| read | 0 |
| read_av | 1 |
| decrypt_av | 1 |
| decode_mpeg | 0 |
| write | 0 |
| os_call | 0 |
| os_return | 1 |

Fig. 11

| #n | ALIAS | INSTRUCTIONS OF OS_CALL |
|---|---|---|
| ⋮ | ⋮ | ⋮ |
| 98 | PLAY_AV | (1) read_av<br>(2) decrypt_av<br>(3) decode_mpeg<br>(4) write |
| 99 | COPY | (1) read<br>(2) write |
| ⋮ | ⋮ | ⋮ |

OS_CALL #n — 82

Fig. 20

| OPERATION MODE | EXECUTION-PERMITTED INSTRUCTION (PRIVILEGE LEVEL) |
|---|---|
| USER MODE | USER INSTRUCTION(0) |
| AV MODE | AV INSTRUCTION(2) |
| SUPERVISOR MODE | SUPERVISER INSTRUCTION(1), USER INSTRUCTION(0) |

Fig. 21

| INSTRUCTION | PRIVILEGE LEVEL |
|---|---|
| ⋮ | ⋮ |
| move | 0 |
| add | 0 |
| stop | 1 |
| reset | 1 |
| ⋮ | ⋮ |
| seek | 0 |
| read | 0 |
| read_av | 2 |
| decrypt_av | 2 |
| decode_mpeg | 0 |
| write | 0 |
| os_call | 0 |
| os_return | 1 |

Fig. 27

| INSTRUCTION | PRIVILEGE LEVEL |
|---|---|
| ⋮ | ⋮ |
| move | 0 |
| add | 0 |
| stop | 1 |
| reset | 1 |
| ⋮ | ⋮ |
| seek | 0 |
| read | 0 |
| read_av | 2 |
| write | 0 |
| os_call | 0 |
| os_return | 1 |
| av_call | 0 |
| av_return | 2 |

… continued …

MICROPROCESSOR SUITABLE FOR REPRODUCING AV DATA WHILE PROTECTING THE AV DATA FROM ILLEGAL COPY AND IMAGE INFORMATION PROCESSING SYSTEM USING THE MICROPROCESSOR

BACKGROUND OF THE INVENTION (1) Field of the Invention

This invention relates to a microprocessor and an image information processing system which include instructions for reproducing moving picture data for a movie and the like, more specifically to a microprocessor and the like suitable for preventing illegal copy of digital works.

(2) Description of the Prior Art

Improvements in multimedia techniques have made it possible for image information processing systems such as personal computers to directly reproduce Audio Visual (AV) data such as moving pictures stored in CD-ROMs. The AV data used here indicates multimedia data which is a mixture of image data, voice data, program data, etc. Also, "reproduction" indicates that the AV data is reproduced in a manner human being can see and hear.

FIG. 1 is a block diagram showing the construction of a conventional image information processing system for reproducing the AV data.

The conventional image information processing system is, for example, a system being mainly comprised of an IBM PC/AT compatible computer. This system includes speaker 60, CD-ROM 61, disk reproduction drive 62, MPEG decoder 63, hard disk apparatus 64, input unit 65, I/O bus 66, video signal processing unit 67, control unit 68, keyboard 69, mouse 70, and display apparatus 71.

CD-ROM 61 stores the AV data compressed under Moving Picture Expert Group 1 (MPEG1) (AV data compressed under MPEG is called MPEG data).

Control unit 68 is comprised of a general-purpose microprocessor 681 connected to processor bus 682, bus I/F 683, and main memory 684 in which a reproduction control program is loaded.

MPEG decoder 63 is comprised of a multiplier and the like and is a card-type module that generates image data and voice data by decompressing the MPEG data, that is by performing an inverse encoding, an inverse quantization, an inverse Discrete Cosine Transform (DCT). MPEG decoder 63 is included in an expansion card box which is not shown in the drawings.

Video signal processing unit 67 converts the image data and voice data input through I/O bus 66 into an image signal and a voice signal respectively, then outputs the signals to display apparatus 71 and speaker 60. Note that "data" indicates digital information, "signal" indicates analog information.

Control unit 68 of the above constructed conventional image information processing system, on receiving a reproduction instruction from a user through keyboard 69 or mouse 70, allows input unit 65 to detect the instruction and reads MPEG data from CD-ROM 61 to main memory 684 by controlling disk reproduction drive 62.

Control unit 68 then sends the MPEG data to MPEG decoder 63 for decompression. Control unit 68 transfers the decompressed image data and voice data to video signal processing unit 67 to convert them to an analog image signal and an analog voice signal. The analog image signal and the analog voice signal are then output to display apparatus 71 and speaker 60.

The conventional image information processing system achieves the reproduction of the AV data stored in CD-ROM 61 through interactive operations with the user.

However, the conventional image information processing system has the following problems.

Firstly, the system requires an independent card module, or MPEG decoder 63. That is, to enjoy the reproduction of the AV data, the user needs to purchase an independent card module, namely, MPEG decoder 63 as well as a general-purpose personal computer and install it to the expansion card box. Also, one slot of the expansion card box is occupied by the card module.

Secondly, the conventional system has no means to prevent illegal copies of the AV data (digital work) stored in CD-ROM 61. With the above system, it is easy to copy the AV data from CD-ROM 61 to hard disk apparatus 64 or a write-enabled optical disk and the like and sell without a permission by the copyright owner. If the medium prices are raised to include the loss generated by the copyright infringement, users will have great disadvantages.

SUMMARY OF THE INVENTION

It is therefore an object of the present invention to provide a microprocessor and an image information processing system which reproduce AV data without an independent card module such as an MPEG decoder and prevent illegal copies of such digital works.

The above object is achieved by a microprocessor for executing an instruction loaded in a memory, the microprocessor comprising: instruction fetch means for fetching the instruction from the memory; instruction decode means for decoding the instruction fetched by the instruction fetch means, wherein the instruction includes an AV data reproduce instruction; and execute means for executing the instruction decoded by the instruction decode means, wherein the execute means comprises: an AV data reproduce unit for, when the instruction decode means decodes the AV data reproduce instruction, inseparably executing a process of storing compressed AV data into the memory and a process of decompressing the compressed AV data of the memory.

Since the microprocessor of the present invention includes an instruction dedicated to reproducing of compressed AV data, it is possible to construct the image information processing system, namely, the soft decode system, which reproduces AV data without an independent card module such as an MPEG decoder.

Also, since the present microprocessor reads compressed AV data from a record medium and the like and performs processes of loading and decompressing the read data inseparably, it is possible to prevent illegal copies or malfunctions where compressed AV data is transferred before being decompressed.

The above microprocessor may further comprise: operation mode storage means for storing an operation mode, wherein the operation mode is either of a first operation mode under which all kinds of instructions may be executed and a second operation mode under which certain kinds of instructions may be executed, wherein the instruction decoded by the instruction decode means includes an AV data store instruction and an AV data decompress instruction, wherein the instruction decode means decodes the AV data store instruction only when the mode storage means stores the first operation mode, wherein the execute means further comprises: a storage unit for performing the process of storing compressed AV data into the memory when the instruction decode means decodes the AV data store instruction; and a decompress unit for performing the process of decompressing the compressed AV data when the instruction decode means decodes the AV data decompress instruction, wherein the AV data reproduce unit updates the operation mode of the operation mode storage means to the first operation mode before performing the process of storing compressed AV data into the memory and the process of decompressing the compressed AV data respectively based on the AV data store instruction and the AV data decompress instruction.

With the above construction, it is possible to prevent an illegal action, where the AV data store instruction is executed without the AV data decompress instruction being executed, by setting a limitation of updating the operation mode to the first operation mode. This is because firstly, to execute the AV data store instruction independently, the operation should be the first operation mode, and secondly, the AV data reproduce instruction, which has no limitation on the operation mode, performs processes of loading and decompressing the AV data inseparably.

In the above microprocessor, the instruction decoded by the instruction decode means may include an AV data read instruction and an AV data decrypt instruction, wherein the execute means further comprises: a read unit for reading encrypted compressed AV data from an external apparatus when the instruction decode means decodes the AV data read instruction; and a decrypt unit for decrypting the encrypted compressed AV data when the instruction decode means decodes the AV data decrypt instruction, wherein the AV data reproduce unit performs the process of reading encrypted compressed AV data and the process of decrypting the encrypted compressed AV data respectively based on the AV data read instruction and the AV data decrypt instruction before performing the process of storing compressed AV data into the memory.

With the above construction, tapping of compressed AV data while the AV data is being read is prevented since the compressed AV data has been encrypted before the present microprocessor reads the data from the external apparatus. It is possible to prevent an illegal action where the decrypted compressed AV data is transferred to another apparatus without being decompressed since the AV data reproduce instruction performs processes of decrypting and decompressing the encrypted compressed AV data inseparably.

The above object is also achieved by an image information processing system comprising: an AV data read apparatus for reading digital data from an external medium, encrypting the digital data if the digital data is compressed AV data, and outputting the encrypted compressed AV data; an AV output apparatus for receiving image data and voice data, converting the image data and voice data respectively into an image signal and a voice signal, and displaying an image and outputting a voice; a control apparatus, comprising the microprocessor and the memory described in claims 1 and 31 for converting the encrypted compressed AV data output from the AV data read apparatus into the image data and the voice data and transferring the image data and the voice data to the AV output apparatus.

With the above construction, it is possible to achieve the image information processing system which reproduces AV data by executing the os_call instruction without an independent card module such as an MPEG decoder and prevents illegal copies of such digital works.

In the above microprocessor, the execute means may further comprise: a microprogram storage unit for prestoring at least a microprogram corresponding to each instruction decoded by the instruction decode means, wherein the AV data reproduce unit performs the process of storing compressed AV data into the memory and the process of decompressing the compressed AV data based on the microprogram prestored in the microprogram storage unit.

With the above construction, it is possible to prevent an illegal action where an interrupt request is issued and the compressed AV data is used for another purpose without being decompressed after being stored. This is because the AV data reproduce instruction is achieved as a microprogram.

In the above microprocessor, the AV data reproduce unit may perform a process of decrypting encrypted compressed AV data to generate the compressed AV data before performing the process of storing the compressed AV data into the memory.

With the above construction, it is possible to prevent an illegal action where an interrupt request is issued and the encrypted compressed AV data is used for another purpose without being decompressed after being decrypted. It is also possible to avoid a problem that an interrupt request is not received for a long time since the above process may be separated from a process of reading encrypted compressed AV data from an external apparatus.

In the above microprocessor, the AV data reproduce unit may read the encrypted compressed AV data before performing the process of decrypting the encrypted compressed AV data.

With the above construction, it is possible to achieve a convenient AV data reproduce instruction which performs a series of reproduction processes including reading, decrypting, and decompressing of encrypted compressed AV data from a record medium.

The above object is also achieved by an image information processing system comprising: an AV data read apparatus for reading digital data from an external medium, encrypting the digital data if the digital data is compressed AV data, and outputting the encrypted compressed AV data; an AV output apparatus for receiving image data and voice data, converting the image data and voice data respectively into an image signal and a voice signal, and displaying an image and outputting a voice; a control apparatus, comprising the microprocessor and the memory described in claims 1 and 7, for converting the encrypted compressed AV data output from the AV data read apparatus into the image data and the voice data and transferring the image data and the voice data to the AV output apparatus.

With the above construction, it is possible to achieve the image information processing system which reproduces AV data based on the microprogram stored in the microprocessor without an independent card module such as an MPEG decoder and prevents illegal copies of such digital works.

The above object is also achieved by a microprocessor for executing an instruction loaded in a memory, the microprocessor comprising: instruction fetch means for fetching the instruction from the memory; instruction decode means for decoding the instruction fetched by the instruction fetch means; wherein the instruction includes an AV data read instruction, wherein the instruction decode means comprises a privilege infringement monitor unit for judging whether a privilege infringement has occurred if the instruction fetched by the instruction fetch means is the AV data read instruction, and stoping decoding of the AV data read instruction if the privilege infringement monitor unit judges that the privilege infringement has occurred; and execute means for executing the instruction decoded by the instruction decode means, wherein the execute means comprises: an AV data read unit for, when the instruction decode means decodes the AV data read instruction, reading compressed AV data from an external medium and storing the read compressed AV data into the memory.

With the above construction, it becomes easier to prevent a copyright infringement of digital works by an illegal action or a malfunction since compressed AV data is read from an external medium only when a privilege infringement does not occur.

In the above microprocessor, the privilege infringement monitor unit, comprising an operation mode storage unit for storing information specifying a current operation mode of the microprocessor, may judge that the privilege infringement has not occurred if the instruction fetched by the instruction fetch means is the AV data read instruction and if the information stored in the operation mode storage unit specifies an operation mode under which only instructions for processing AV data may be executed.

With the above construction, the AV data is processed only under the third operation mode which is different from the conventional user mode or supervisor mode. This makes it easier to protect a digital work storing compressed AV data from the illegal usage.

In the above microprocessor, the instruction decoded by the instruction decode means may further include an AV data transfer instruction, wherein the execute means further comprises a transfer unit for, if the instruction decode means decodes the AV data transfer instruction, transferring the compressed AV data from the memory to a specified location, wherein the execute means further comprises: an area storage unit for storing information which specifies a predetermined AV data area of the memory; and an access area monitor unit for judging whether the specified location is in the predetermined AV data area by referring to an address of the specified location and stopping the transferring of the compressed AV data to the specified location.

With the above construction, it is possible to prohibit an illegal action where a user not having an authority reads compressed AV data secretly from a memory since a specific area in the memory can be used as a protect memory.

In the microprocessor, the access area monitor unit may stop transferring of the compressed AV data by cutting an output of an address signal output by the microprocessor.

With the above construction, accesses to the protect memory is prohibited physically. This prevents illegal actions and malfunctions even tighter.

The above object is also achieved by an image information processing system comprising: an AV data read apparatus for reading digital data from an external medium, encrypting the digital data if the digital data is compressed AV data, and outputting the encrypted compressed AV data; an AV output apparatus for receiving image data and voice data, converting the image data and voice data respectively into an image signal and a voice signal, and displaying an image and outputting a voice; a control apparatus, comprising the microprocessor and the memory described in claims 1 and 12, for converting the encrypted compressed AV data output from the AV data read apparatus into the image data and the voice data and transferring the image data and the voice data to the AV output apparatus.

With the above construction, it is possible to achieve the image information processing system which prevents illegal copies and malfunctions not only by checking the address in the memory to be accessed but by checking the operation mode and the instruction type.

The above object is also achieved by an image information processing system comprising: a first storage means for storing a reproduction control program for reproducing compressed AV data, wherein the reproduction control program includes a set of encrypted instructions and a set of not-encrypted instructions, wherein each of the encrypted instructions includes an instruction for dealing with the compressed AV data and each of the not-encrypted instructions includes a call instruction for moving an execution control to an encrypted instruction; and a microprocessor which comprises execute means for executing an instruction stored in the first storage means, wherein the execute means comprises: an execution prohibit unit for prohibiting the call instruction from being executed based on a signature code included in the call instruction; and a decrypt unit for decrypting the set of encrypted instructions before the set of encrypted instructions are executed.

With the above construction, instructions which are to deal with compressed AV data are encrypted. To execute such an instruction, the signature code is required. Accordingly, it is possible, by managing the signature code secretly, to prohibit an illegal action where a user not having an authority uses compressed AV data for another purpose without reproducing the data by illegally using or modifying the reproduction control program.

In the image information processing system, the execution prohibit unit may judge whether an instruction to be executed generates a privilege infringement and prohibits the instruction from being executed if the execution prohibit unit judges that the instruction generates the privilege infringement.

With the above construction, it is possible to further improve the safety since illegal actions are prohibited not only by monitoring the operation mode but by encrypting the instructions.

The above image information processing system may further comprise: second storage means, wherein the microprocessor further comprises an operation mode storage unit for storing information specifying a current operation mode of the microprocessor, wherein the execution prohibit unit prohibits the instruction from being executed if the instruction is to access the second storage means and if the information stored in the operation mode storage unit specifies an operation mode under which instructions for processing AV data are prohibited from being executed.

With the above construction, the second storage means is a protect memory dedicated to AV data. This enables the prohibition of illegal copies and malfunctions to be achieved by monitoring the type of memory to be accessed.

The above image information processing system may further comprise: an AV data read apparatus for reading compressed AV data from an external medium and outputting the compressed AV data; an AV output apparatus for receiving image data and voice data, converting the image data and voice data respectively into an image signal and a voice signal, and displaying an image and outputting a voice; wherein the microprocessor, based on the reproduction control program, converts the compressed AV data output from the AV data read apparatus into the image data and the voice data and transferring the image data and the voice data to the AV output apparatus.

With the above construction, the copyrights of digital works are tightly protected from illegal actions or malfunctions based on encrypting of the reproduction control program, monitoring of the privilege infringement by checking the operation mode, monitoring of the type of the memory to be accessed, etc.

As is described above, the present invention achieves the image information processing system which reproduces AV data based on the microprogram stored in the microprocessor without an independent card module such as an MPEG decoder and prevents illegal copies of such digital works. Today, the practical merits of the present system are great, when the sound development of the multimedia industry is required.

DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 11 shows some of the os_call#n instructions included in the present image information processing system and the operations;

FIG. 20 shows the operation modes and the instructions whose executions are permitted under the operation modes;

FIG. 21 shows the types of instructions and the corresponding privilege levels which are stored in microprogram memory 154;

FIG. 27 shows a table stored in instruction executing unit 553 showing the relation between instructions and privilege levels required to execute the instructions.

DESCRIPTION OF THE PREFERRED EMBODIMENTS

The following is the description of preferred embodiments of the image information processing system and the microprocessor of the present invention with reference to the drawings.

*1. First Embodiment

The image information processing system of the first embodiment reproduces the AV data, the system being characterized by a microprocessor including instructions dedicated to decoding of MPEG data and a program construction for preventing the illegal copy of works.

*1.1 Construction of Image Information Processing System

Figure 2:
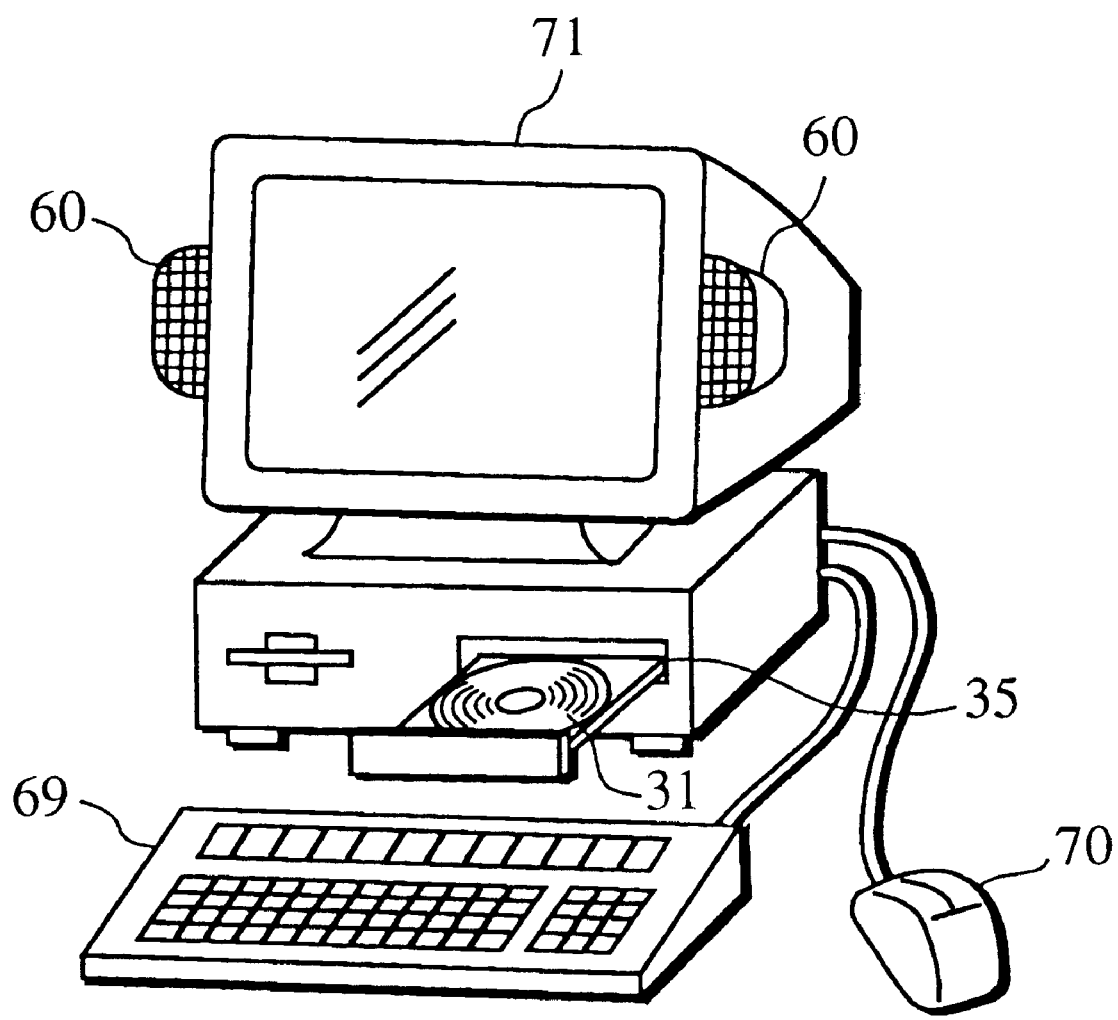
FIG. 2 shows an appearance of the image information processing system of the first embodiment.

FIG. 2 shows an appearance of the image information processing system of the present embodiment.

Figure 3:
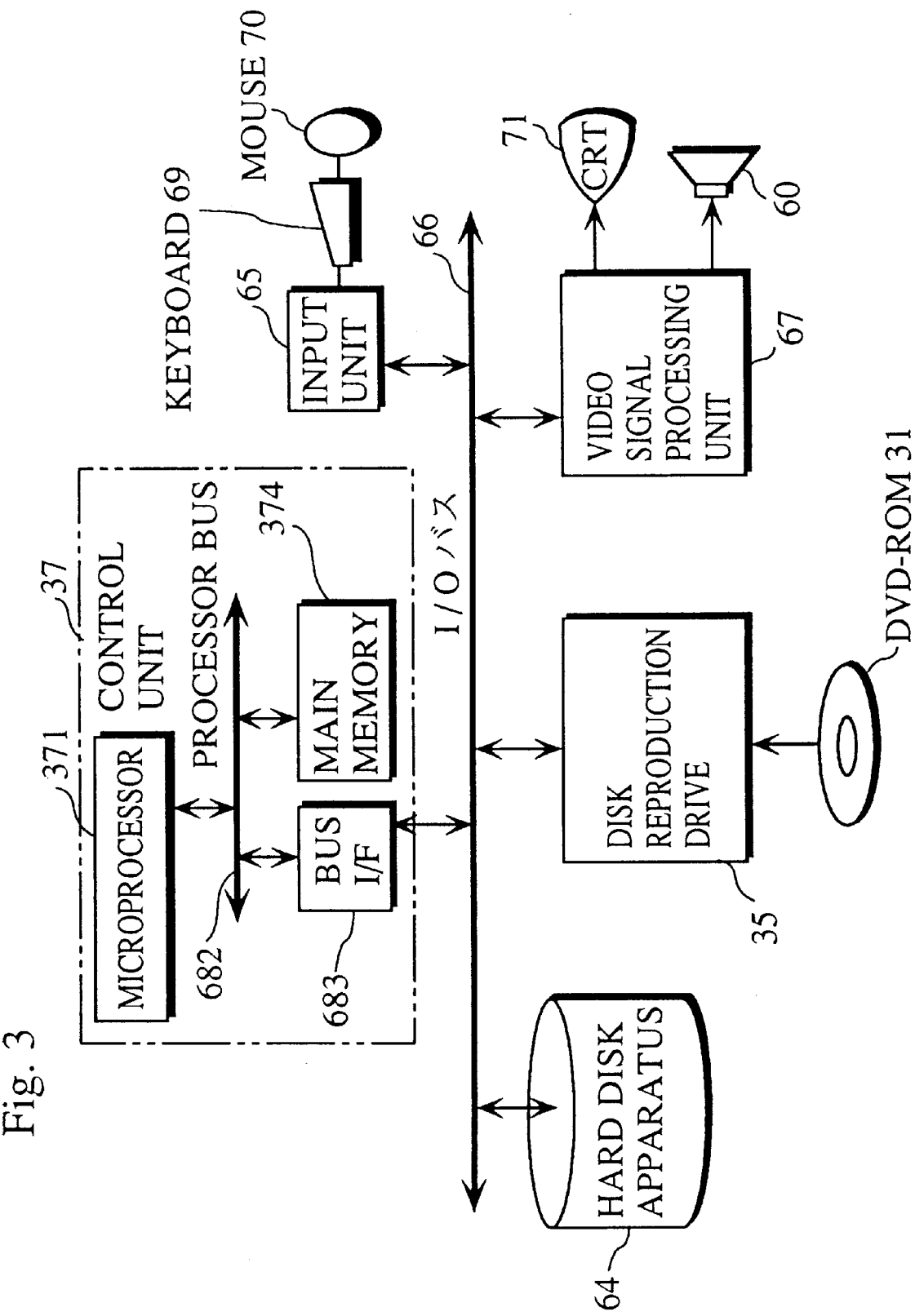
FIG. 3 is a block diagram showing the construction of the present image information processing system.

FIG. 3 is a block diagram showing the construction of the present image information processing system.

Figure 1:
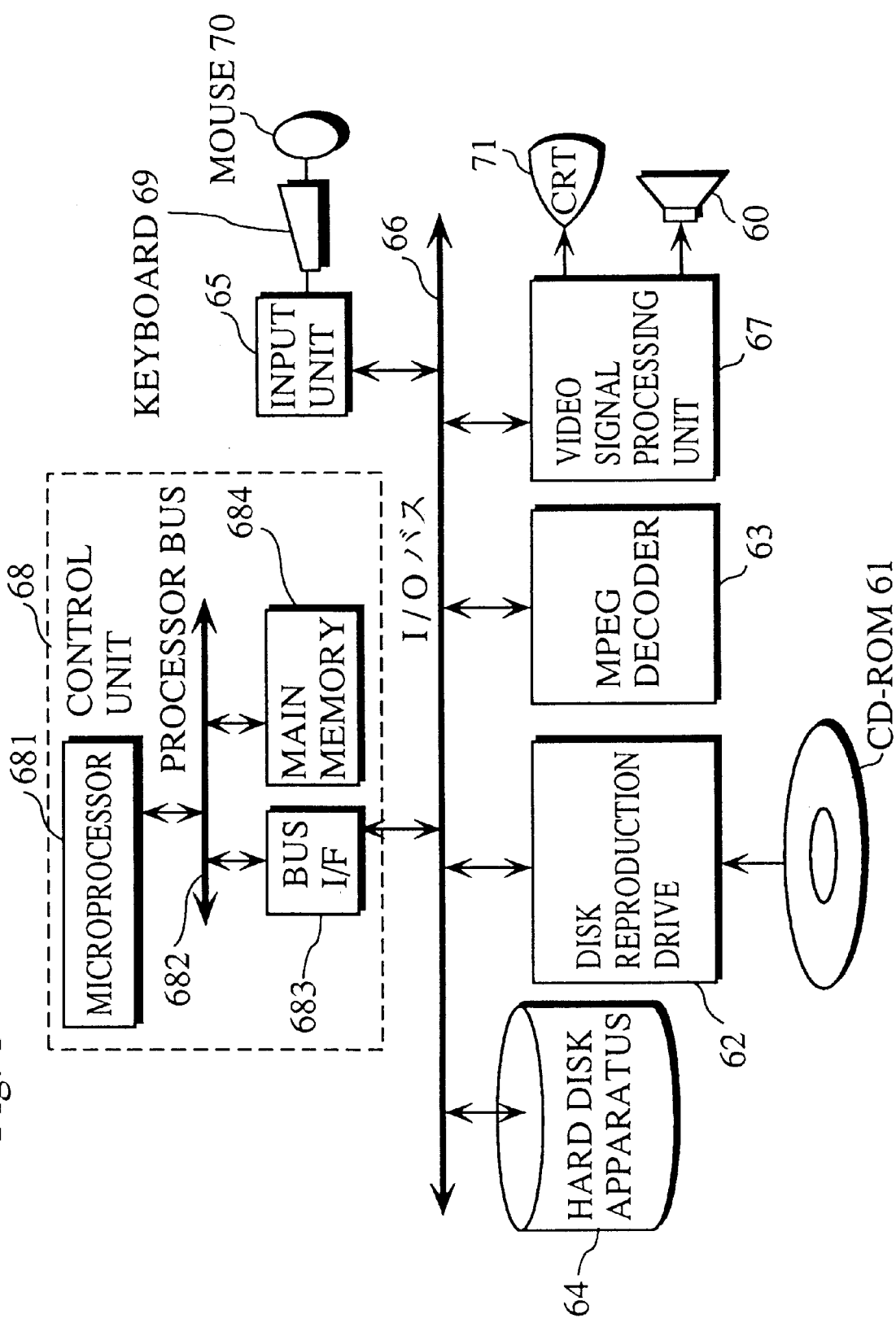
FIG. 1 is a block diagram showing the construction of the conventional image information processing system.

The present image information processing system comprises speaker 60, DVD(Digital Versatile/Video Disk)-ROM 31, disk reproduction drive 35, video signal processing unit 67, hard disk apparatus 64, input unit 65, I/O bus 66, video signal processing unit 67, control unit 37, keyboard 69, mouse 70, and display apparatus 71. Among the above elements, 60, 64–67, 69–71 are the same as those shown in FIG. 1.

*1.1.1 DVD-ROM 31

DVD-ROM 31 is a phase-change type optical disk having about 5 GB of storage capacity and provides the data transfer rate five times as that of CD-ROM 61. Due to the performance, MPEG2 is adopted as the method for compressing the AV data stored in DVD-ROM 31. MPEG2 can reproduce moving pictures with higher quality than those reproduced by MPEG1. In the present embodiment, DVD-ROM 31 stores a movie of more than two hours and the like.

FIGS. 4(a)–4(f) show a construction for storing physical data, the construction being called the physical format of DVD-ROM 31.

Figure 4:
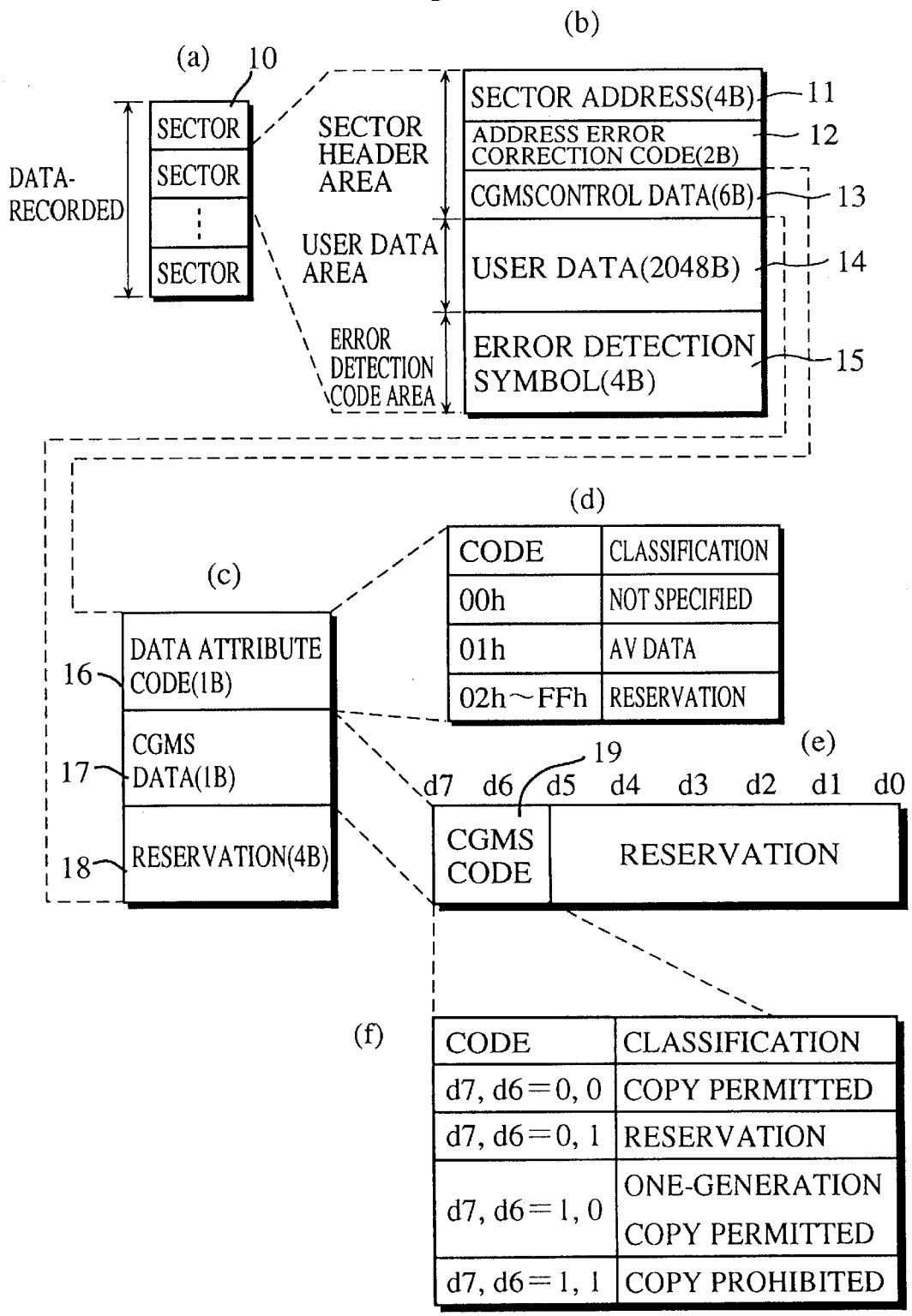
FIGS. 4 (a)–4(f) show the physical format of DVD-ROM 31.

As shown in FIG. 4(a), data-recorded of DVD-ROM 31 consists of a set of sectors 10 which are minimum units of writing or reading data.

As shown in FIG. 4(b), each sector includes, from the beginning, a header area of 12 bytes, a user data area of 2,043 bytes, and an error detection code area of four bytes.

The user data area stores user data 14. The user data is divided into AV data, non-AV data, and file management information 21, where the AV data and non-AV data are called digital data, non-AV data is, for example, program data which does not include image data nor voice data, and file management information 21 is information for the filing system in which files are managed with such a construction as a plurality of sectors 10 make up a file, a plurality of files a directory.

The sector header area stores, in order, a sector address 11, which is address information for identifying sectors 10, an error correcting code 12 of the sector address 11, and a Copy Generation Management System (CGMS) control data 13 used when the sector reproduction is controlled.

As shown in FIG. 4(c), the CGMS control data 13 is comprised of a data attribute code 13, CGMS data 17, and reservation 18.

FIG. 4(d) shows data attribute code 16 and the classification of data attribute code 16.

Data attribute code 16 has one byte. Data attribute code 16 is "01h" (h indicates hexadecimal notation) indicates that the AV data is recorded in the user data area of the sector 10; "00h" indicates that a data attribute is not specified.

FIG. 4(e) shows the construction of the CGMS data. The CGMS data has 1 byte, of which upper 2 bits are called a CGMS code 19. The CGMS code specifies a use form of the digital data stored in the user data area of the sector.

FIG. 4(f) shows the classification of CGMS code 19.

CGMS code 19 is information specifying whether copying of digital data stored in the user data area is permitted. CGMS code "00" indicates a copy permitted, "10" a one-generation copy permitted, and "11" a copy prohibited.

Figure 5:
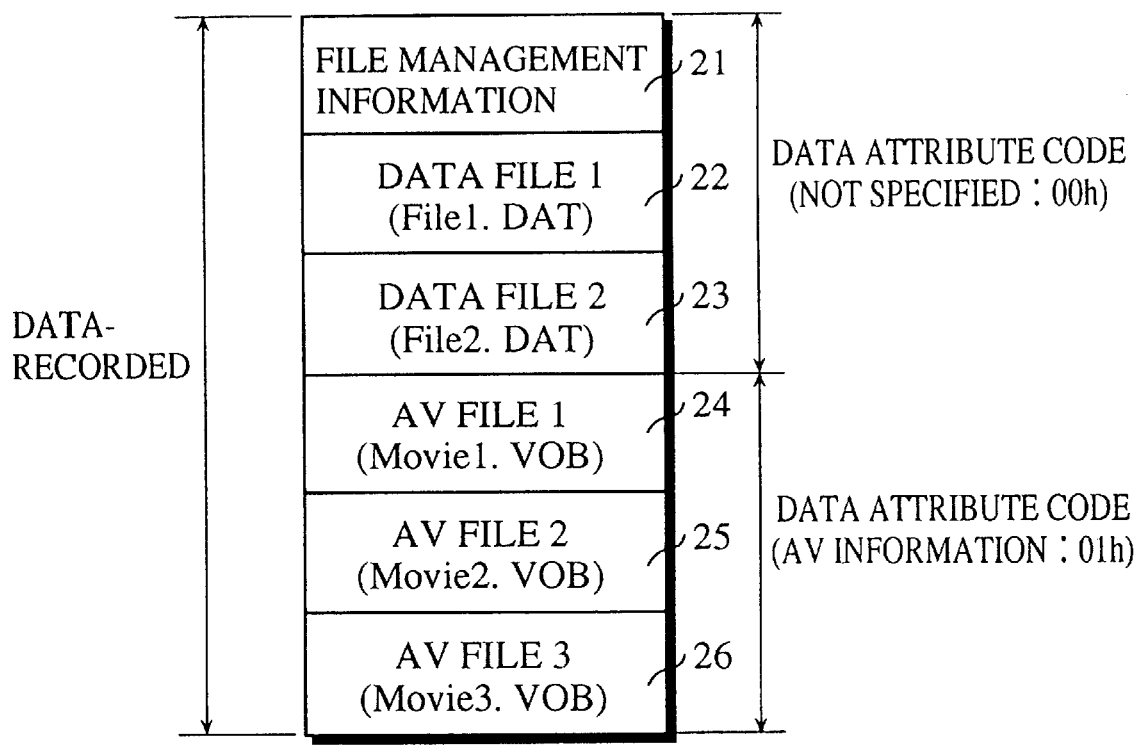
FIGS. 5(a)–(b) show the logical format of DVD-ROM 31.
Figure 5:
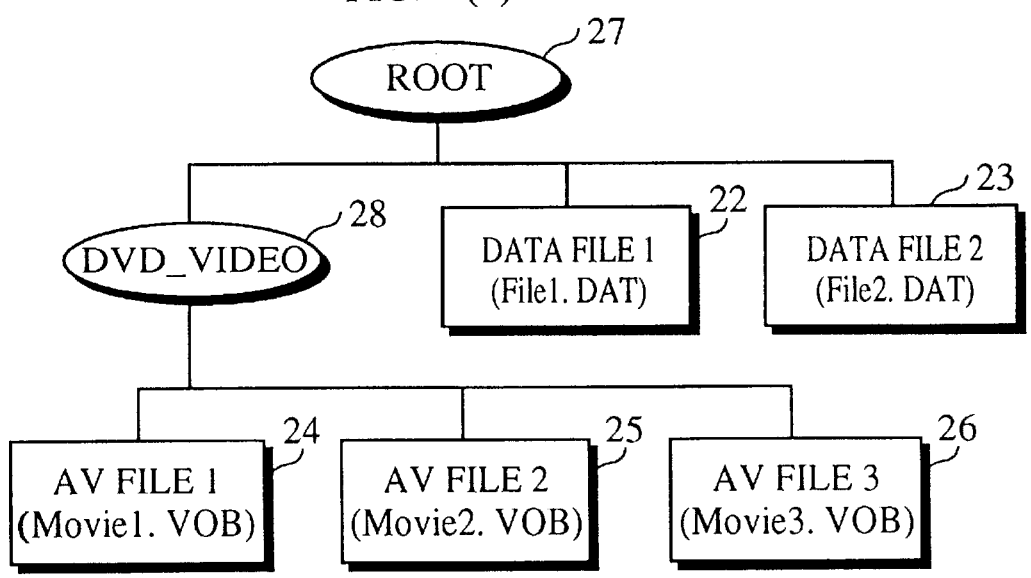

FIGS. 5(a)–(b) show a logical construction of the recorded data called the logical format of DVD-ROM 31.

As shown in FIG. 5(a), at the first place of the data-recorded is file management information 21, then follow files 22–26. The "file" indicates a unit which includes a plurality of sectors and is used to manage the sectors in groups. The file management information includes the attribute of each file. The file management information may also include information used to manage files in units of directories.

FIG. 5(b) shows a tree of the file/directory construction in the present embodiment.

The ovals 27 and 28 in the drawing indicate directories, the rectangles 22–26 files. In this example, DVD_VIDEO directory 28 and File1.DAT 22 and File2.DAT 23 are linked to R00T directory 28, and three files, namely, Movie1.VOB 24, Movie2.VOB 25, and Movie3.VOB 26 are linked to the DVD_VIDEO directory.

Note that in the present embodiment, a naming standard is applied to the files storing AV data (hereinafter called AV files). That is, file names with extension VOB are regarded as AV files. A directory named DVD_VIDEO is a directory dedicated to storing AV data. Movie1.VOB 24, Movie2.VOB 25, and Movie3.VOB 26 are AV files. Therefore, File1.DAT 22 and File2.DAT 23 are files not storing AV data (hereinafter called non-AV files).

*1.1.2 I/O Bus 66

I/O bus 66 is an internal bus of the present image information processing system and is, for example, a digital interface called ATAP (AT Attachment Packet Interface). I/O bus 66 connects to control unit 37, input unit 65, hard disk apparatus 64, disk reproduction drive 35, and video signal processing unit 67.

*1.1.3 Hard Disk Apparatus 64

Hard disk apparatus 64, being a magnetic record apparatus having storage capacity of 1 GB, stores a reproduction control program, which is to be loaded into main memory 374 in control unit 37, and is a copy destination of the digital data in DVD-ROM 31.

*1.1.4 Input Unit 65

Input unit 65 is an interface circuit for receiving instructions from the user which are input through mouse 70 or keyboard 69.

*1.1.5 Disk Reproduction Drive 35

Disk reproduction drive 35 reads digital data from DVD-ROM 31 according to instructions from control unit 37.

Figure 6:
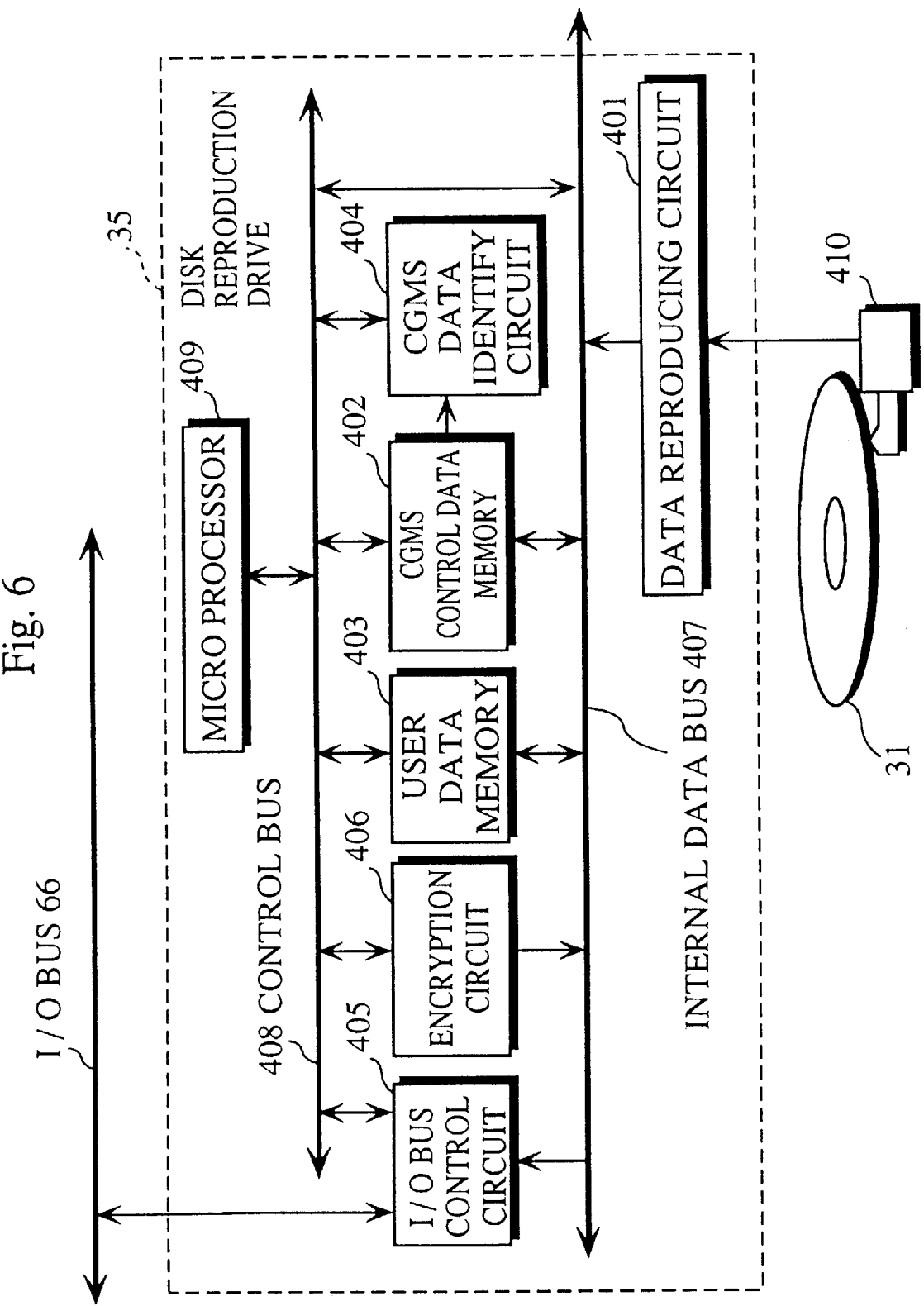
FIG. 6 is a block diagram showing the construction of disk reproduction drive 35.

FIG. 6 is a block diagram showing a construction of disk reproduction drive 35.

As shown in the drawing, disk reproduction drive 35 includes optical head 410, data reproducing circuit 401, CGMS control data memory 402, user data memory 403, CGMS data identify circuit 404, I/O bus control circuit 405, encryption circuit 406, internal data bus 407, control bus 408, and microprocessor 409.

Data reproducing circuit 401, on receiving a specified sector number from microprocessor 409, reads digital data (sector data 11–15) from a sector 10 of DVD-ROM 31 specified by the sector number through optical head 410 by controlling the disk drive apparatus. Of the read sector data 11–15, user data 14 and CGMS control data are respectively stored in user data memory 403 and CGMS control data memory 402.

CGMS control data memory 402 is a RAM for temporarily storing CGMS control data 13 read out by data reproducing circuit 401.

User data memory 403 is a RAM for temporarily storing user data 14 read out by data reproducing circuit 401.

CGMS data identify circuit 404 reads CGMS control data 13 from CGMS control data memory 402, judges whether the user data attribute stored in user data memory 403 is "not specified," "AV data," etc. by referring to data attribute code 16 of CGMS control data 13, and notifies microprocessor 409 of the judgement result. CGMS data identify circuit 404 also judges whether the user data copy limitation information stored in user data memory 403 is "copy permitted," "one-generation copy permitted," or "copy prohibited" by referring to CGMS data 17 of CGMS control data 13, and notifies microprocessor 409 of the judgement result.

I/O bus control circuit 405 is an interface circuit connecting to disk reproduction drive 35 and I/O bus 66 and transmits/receives commands and data.

Encryption circuit 406 performs data encryption under Data Encryption Standards (DES) by using internally held secret key data. More specifically, encryption circuit 406, on receiving an instruction from microprocessor 409, reads user data 14 from user data memory 403, encrypts the user data, and returns the encrypted data to user data memory 403.

Internal data bus 407 is a data transfer path through which data read by data reproducing circuit 401 is transferred and through which data input/output by I/O bus control circuit 405 via I/O bus 66 is transferred.

Control bus 408 is a data transfer path through which instructions issued from microprocessor 409 are transferred and the process result information and the like sent respectively from circuits 401–406 is transferred.

Microprocessor 409 controls disk reproduction drive 35 according to the command received by I/O bus control circuit 405.

The following is a description of the control by microprocessor 409 for, for example, the dsk_read command and the dsk_read_av command, where the dsk_read command is used to read non-AV data recorded in DVD-ROM 31 and the dsk_read_av command is used to read AV data.

Microprocessor 409, on judging that an input command is "dsk_read" for data reading, reads digital data from a sector of DVD-ROM 31 specified by the sector number attached to the command by controlling data reproducing circuit 401. The read digital data is divided into CGMS control data 13 and user data 14 then these pieces of data are respectively stored in CGMS control data memory 402 and user data memory 403.

After the above process, microprocessor 409 instructs CGMS data identify circuit 404 to judge whether user data 14 stored in user data memory 403 is AV data. If the user data 14 is non-AV data, microprocessor 409 transfers the user data to the destination indicated by the destination information attached to the above command by controlling I/O bus control circuit 405. If the user data 14 is AV data, microprocessor 409 converts the whole user data (2,048 bytes) into NULL data as a copyright protection process and transfers the NULL data to the destination by controlling I/O bus control circuit 405.

Microprocessor 409, on judging that an input command is "dsk_read_ave" for AV data reading, reads digital data from a sector of DVD-ROM 31 specified by the sector number attached to the command by controlling data reproducing circuit 401. The read digital data is divided into CGMS control data 13 and user data 14 then these pieces of data are respectively stored in CGMS control data memory 402 and user data memory 403.

After the above process, microprocessor 409 encrypts the whole user data (2,048 bytes) in user data memory 403 by controlling encryption circuit 406. Microprocessor 409 changes the unit of data transfer to 2,054 bytes and, by controlling I/O bus control circuit 405, transfers to the destination 2,054 bytes of digital data which is a total of CGMS control data 13 (6 bytes) stored in CGMS control data memory 402 and user data 14 (2,048 bytes) stored in user data memory 403.

*1.1.6 Video Signal Processing Unit 67

Video signal processing unit 67, being comprised of a video RAM, a D/A converter, etc., converts image data and voice data input through I/O bus 66 into an image signal and a voice signal respectively, then outputs the converted signals to display apparatus 71 and speaker 60.

*1.1.7 Control Unit 37

Control unit 37 achieves interactive operations with the user, reproduction of AV data stored in DVD-ROM 31, copying of non-AV data from DVD-ROM 31 to hard disk apparatus 64 or the like by controlling elements 35, 64, 65, and 67 of the present image information processing system.

Control unit 37, as shown in FIG. 3, is comprised of microprocessor 371, processor bus 682, bus I/F 683, and main memory 374.

*1.1.7.1 Processor Bus 682

Processor bus 682, connecting to microprocessor 371, bus I/F 683, and main memory 374, is a two-bit bus having a higher data transfer speed than I/O bus 66.

*1.1.7.2 Bus I/F 683

Bus I/F 683 is an interface circuit connecting control unit 37 and I/O bus 66 together.

*1.1.7.3 Main Memory 374

Main memory 374, being a RAM, temporarily stores an AV data reproduction control program and an operating system (a program for controlling program activation, task management, file processing and the like) which are specific to the present image information processing system and loaded from hard disk apparatus 64. Main memory 374 is also used as a data buffer when data is transferred between the apparatuses connected to I/O bus 66.

*1.1.7.4 Microprocessor 371

Microprocessor 371, being achieved in a one-chip LSI, includes the instruction sets described below which are specific to the present image information processing system, as well as such instruction sets as being included in general-purpose microprocessors. Microprocessor 371 performs core controls of the present image information processing system.

Figure 7:
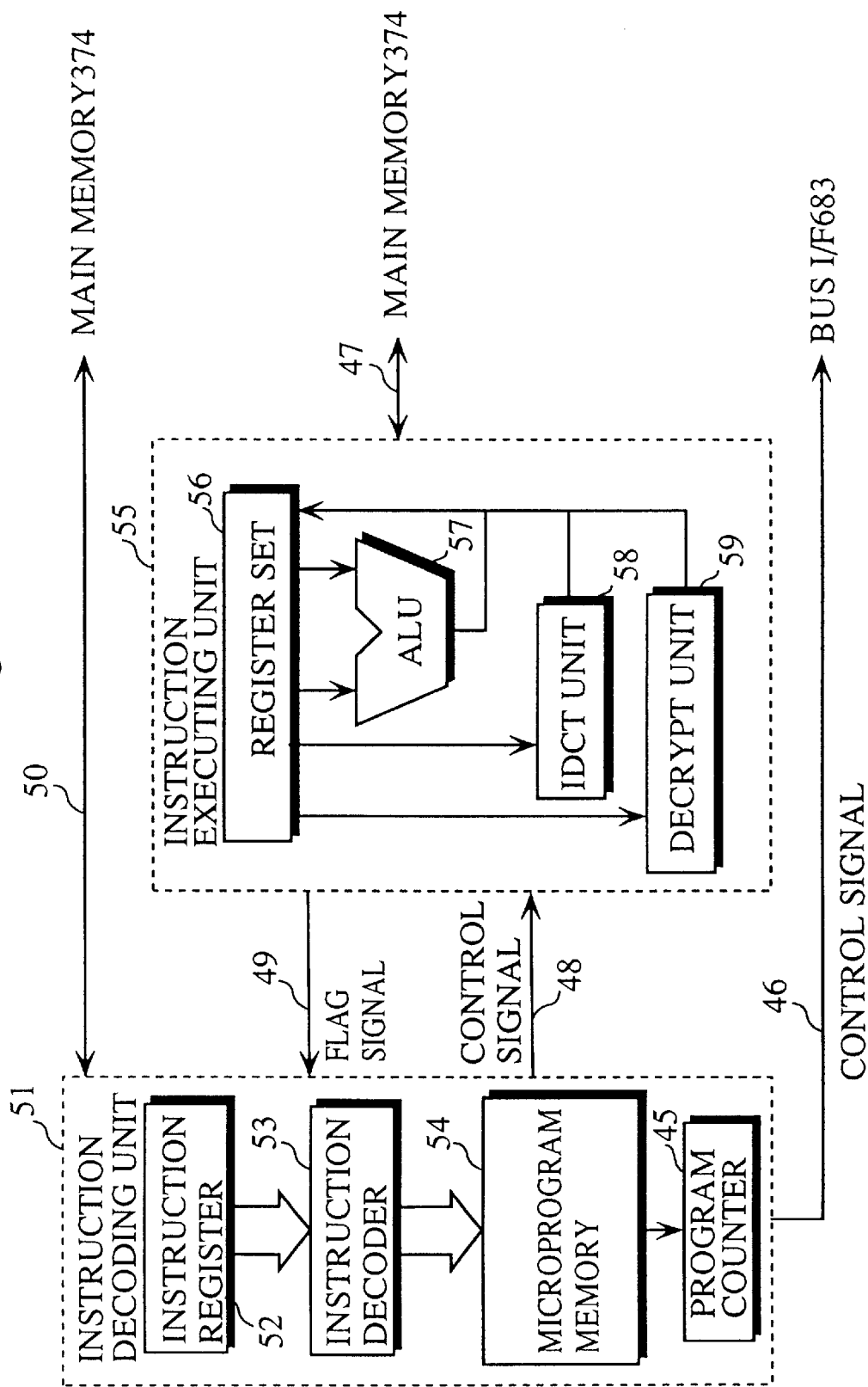
FIG. 7 is a block diagram showing the construction of microprocessor 371.

FIG. 7 is a block diagram showing the construction of microprocessor 371. Microprocessor 371 is mainly comprised of instruction decoding unit 51 and instruction executing unit 55.

*1.1.7.4.1 Instruction executing unit 55

Instruction executing unit 55, being a circuit for executing calculations and the like based on the control by instruction decoding unit 51, is comprised of register set 56, ALU 57, DCT 58, and decryption unit 59.

Register set 56 is a set of 64 32-bit registers, including status register 561 which stores the operation mode of microprocessor 371.

Figure 8:
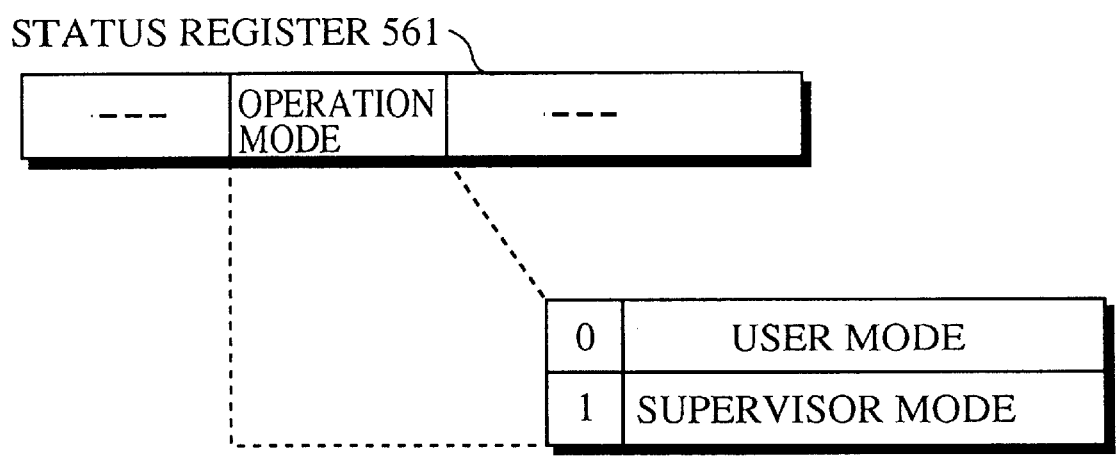
FIG. 8 shows the construction of status register 561.

FIG. 8 shows the construction of status register 561.

Status register 561 stores the operation mode of microprocessor 371. Each operation mode is represented by one bit. If the bit is one, microprocessor 371 is in the user mode, if zero, in the supervisor mode.

In the user mode, microprocessor 371 executes only instructions of privilege level 0 (such instructions are called "user instructions"); in the supervisor mode, execute instructions of privilege level 1 (such instructions are called "supervisor instructions") as well as those of privilege level 0.

Status register 561 also outputs the above operation mode bit to instruction decoding unit 51 as flag signal 49.

ALU 57 performs arithmetic logical operations using data stored in register set 56.

IDCT unit 58, being comprised of a sum-of-products operation circuit and the like, performs an inverse DCT using register set 56. Inverse DCT is a main process in decoding MPEG data.

Decryption unit 59 is a circuit for performing an inverse conversion (decryption) corresponding to the encryption performed by encryption circuit 406.

*1.1.7.4.2 Instruction decoding unit 51

Instruction decoding unit 51 decodes instructions stored in main memory 374 and controls instruction executing unit 55 and bus I/F 683 based on the decoded instructions and is comprised of instruction register 52, instruction decoder 53, microprogram memory 54, and program counter 45.

Instruction register 52 fetches an instruction in main memory 374 from a location specified by an address held by program counter 45 and stores the fetched instruction.

FIG. 9(a) shows the format of the instruction.

Each instruction consists of an instruction code and an operand. The instruction code consists of an instruction identification code and a status. The instruction identification code specifies an instruction type. The status specifies an execution condition and includes one bit representing the privilege level. An instruction with privilege level 0 is a user instruction; instruction with privilege level 1 a supervisor instruction.

Instruction decoder 53 decodes the instruction stored in instruction register 52 and is comprised of a gate circuit and a sequencer and the like. More specifically, instruction decoder 53 lets microprogram memory 54 output control signal 46 or 48 by outputting address information to microprogram memory 54 according to an instruction stored in instruction register 52.

Instruction decoder 53 receives flag signal 49 from instruction executing unit 55. If flag signal 49 is "0" (user mode), instruction decoder 53 decodes only user instructions and performs a certain error handling process for supervisor instructions; if "1" (supervisor mode), decodes all kinds of instructions.

Program counter 45 holds an address of the instruction to be executed next stored in main memory 374. Program counter 45 updates the address each time instruction decoder 53 decodes an instruction.

Microprogram memory 54, being a ROM prestoring microprograms (sets of microcodes) corresponding to the instructions, on receiving an address from instruction decoder 53, outputs a microcode corresponding to the address as control signal 46 to instruction executing unit 55 and bus I/F 683 to execute a calculation and the like specified by the instruction.

Figure 9:
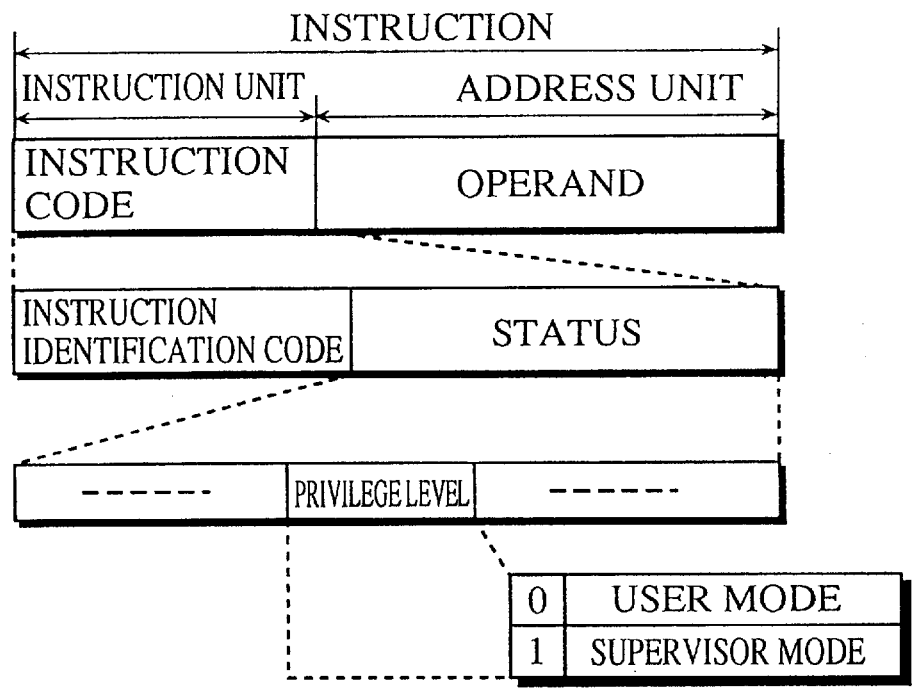
FIG. 9(a) shows the format of the instruction.
FIG. 9(b) shows the types of instructions and the corresponding privilege levels which are stored in microprogram memory 54.

FIG. 9(*b*) shows the types of instructions and the corresponding privilege levels which are defined in microprogram memory 54.

The instruction set includes instructions specific to the present microprocessor 371 ("read_av," "decrypt_av," and "decode_mpeg") as well as data transfer instructions "move," "read," and "write," a calculation instruction "add," and control instructions "stop," "reset," "seek," "os_call," and "os return" which are included in general-purpose microprocessors.

Main instructions among the above instructions are described below.

The stop instruction, a supervisor instruction, is a control instruction for temporarily stopping the operation of microprocessor 371.

The reset instruction, a supervisor instruction, is a control instruction for setting microprocessor 371 to the initial state at power on.

The read instruction, a user instruction, is a transfer instruction for reading non-AV data from an apparatus connected to I/O bus 66 to main memory 374. Note that the dsk_read instruction for disk reproduction drive 35 is output from control unit 37 based on the read instruction.

The read_av instruction, a supervisor instruction, is a transfer instruction for reading AV data from an apparatus connected to I/O bus 66 to main memory 374. Note that the dsk read_av instruction for disk reproduction drive 35 is output from control unit 37 based on the read_av instruction.

The seek instruction, a user instruction, is a control instruction for moving optical head 410 of disk reproduction drive 35 to a read-out position on DVD-ROM 31. Generally, this instruction is executed before the read instruction or the read av instruction is issued.

The decrypt-av instruction, a supervisor instruction, is a calculation instruction for reading digital data loaded in main memory 374 into register set 56 in sequence, decrypting the digital data by ALU 57 and decryption unit 59, and returning the results to main memory 374.

The decode_mpeg instruction, a user instruction, is a calculation instruction for reading MPEG data loaded in main memory 374 into register set 56 in sequence, decompressing the MPEG data (inverse encoding, inverse quantization, inverse DCT) by ALU 57 and IDCT unit 58, and returning the results, namely, image data and voice data, to main memory 374.

The write instruction, a user instruction, is a transfer instruction for outputting data from main memory 374 to I/O bus 66. The image data and voice data obtained by the decode_mpeg instruction are transferred to video signal processing unit 67 by this instruction.

The os_call instruction, a user instruction, is a branch instruction for transferring control from the user program to the operating system.

The os_return instruction, a supervisor instruction, is a branch instruction for transferring control from the operating system to the user program.

The general idea of the os_call and os_return instructions are described below.

Figure 10:
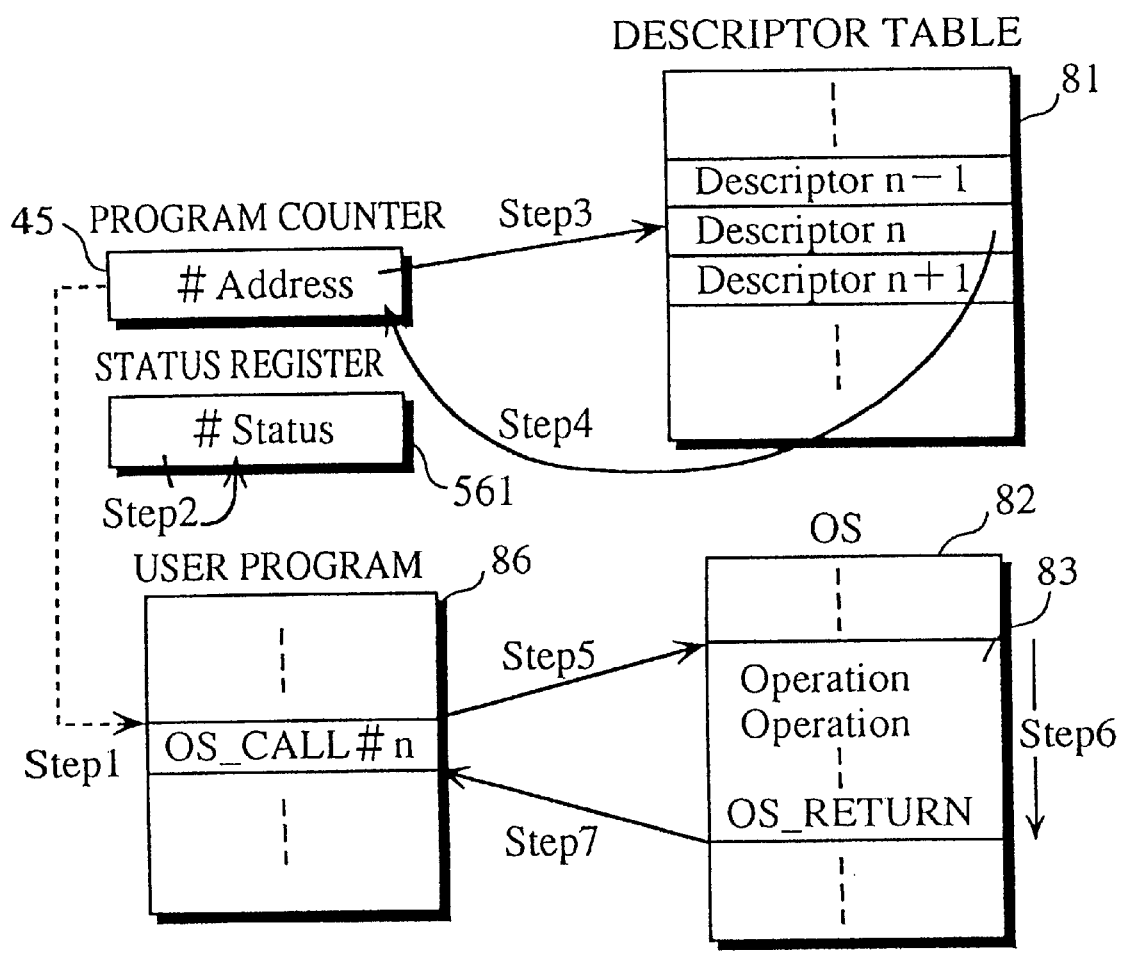
FIG. 10(a) shows the process flow of microprocessor 371 when the os call instruction is executed.
FIG. 10(b) shows the format of descriptors 84 which make up descriptor table 81 shown in FIG. 10(a)
Figure 10:
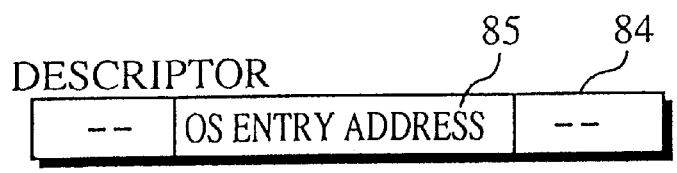

FIG. 10(*a*) shows the process flow of microprocessor 371 when the os call instruction is executed.

FIG. 10(*b*) shows the format of descriptors 84 which make up descriptor table 81 shown in FIG. 10(*a*).

The operating system (OS) 82 appearing in this drawing is a set of system routines 83 stored in main memory 374. Each system routine 83 often includes supervisor instructions. User program 86 is a program stored in main memory 374 specific to the user and calls a plurality of system routines 83. Descriptor table 81 is a data table stored in main memory 374 and is a set of descriptors 84. Each descriptor 84 includes an OS entry address 85 indicating an address of system routine 83.

As shown in FIG. 10(*a*), microprocessor 371, on recognizing that the instruction to be executed next is the os call instruction from the address of program counter 45 (step 1), temporarily saves the operation mode of status register 561 and the address of program counter 45 to main memory 374 and changes the operation mode in status register 561 from the user mode to the supervisor mode (step 2).

Microprocessor 371 then refers to the call number #n specified by the os_call instruction, refers to the descriptor in descriptor table 81 corresponding to the number to read the OS entry address 85, and stores the OS entry address 85 into program counter 45 (steps 3 and 4).

Control then moves from user program 86 to OS 82 to execute system routine 83 (steps 5 and 6).

Microprocessor 371, on decoding the last instruction, namely, the os_return instruction, returns the operation mode to status register 561 and the address to program counter 45 from main memory 374 which have been saved in step 2 (step 7). This allows control to return to the user program at the place immediately after the os_call instruction. Note that the operation mode returns to the user mode from the supervisor mode since status register 561 restores the previous operation mode.

FIG. 11 shows some of the os_call#n instructions included in the present image information processing system and the operations.

The os_call#98 instruction, having alias "PLAY_AV," is a system routine for performing the reproduction of AV data, which is the basic function of the present image information processing system and executes, in sequence, the four instructions: read_av, decrypt_av, decode_mpeg, and write.

The os_call#99 instruction, having alias "COPY instruction," is a system routine for copying non-AV data and executes, in sequence, the two instructions read and write.

*1.1.7.4.3 Operation of Microprocessor 371

The operation of microprocessor 371 constructed as above is described as follows.

Program counter 45 has an address of the instruction to be executed next for user program 86 loaded in main memory 374.

Instruction register 52 fetches the instruction specified by program counter 45.

Instruction decoder 53 judges whether the execution of the instruction is permitted by comparing the privilege level of the fetched instruction with flag signal 49 (current operation mode) sent from instruction executing unit 55.

If not permitted, a certain error handling process is performed; if permitted, the addresses of the microprograms corresponding to the instruction are output to microprogram memory 54 in sequence.

In this way, microprocessor 371 prevents a privilege infringement, namely, an execution of the supervisor instruction under the user mode, by monitoring the privilege level of the fetched instruction.

Meanwhile, microprocessor 371 includes microprogram memory 54 which defines the read_av instruction and decrypt_av instruction as the supervisor instructions. Accordingly, the user cannot create nor execute a program in which these instructions are used independently. The user, for example, cannot execute an application program for copying AV data from main memory 374 to hard disk apparatus 64 by using the read_av instruction and the write instruction.

The read_av instruction and the decrypt_av instruction, on the other hand, are provided for the user as parts of system routine "PLAY_AV" in OS 82. Therefore, the user can create and execute a program including system routine "PLAY_AV." In this case, the read_av instruction and the decrypt_av instruction are inseparably executed. The user, for example, can create and execute a program including the reproduction of AV data; not an application program which executes only data transfers (copying), namely, reading and writing of AV data.

*1.1.7.5 Initial Operation of Control Unit 37

Initial operation of control Unit 37 constructed as above is described below.

When the present image information processing system is turned on, control unit 37 loads OS 82 and user program 86 from hard disk apparatus 64 into main memory 374. The OS 82 includes system routines 83 such as "PLAY_" and "COPY" as shown in FIG. 11. The user program 86 includes routines for performing general processes (interactive operations between the present image information processing system and the user) as well as the routines for calling "PLAY_" and "COPY."

Control unit 37, on detecting that DVD-ROM 31 has been loaded into disk reproduction drive 35, loads file management information 21 from DVD-ROM 31 into main memory 374 under control of OS 82. Control unit 37 calculates the record address in DVD-ROM 31 for each file name by searching the file management information 21 under ISO13346.

*1.2 Operation of Image Information Processing System

Now, the operation of the present image information processing system constructed as above is described.

The description is divided into two parts: reproduction of AV data; and copy of non-AV data.

*1.2.1 Reproduction of AV Data

Figure 12:
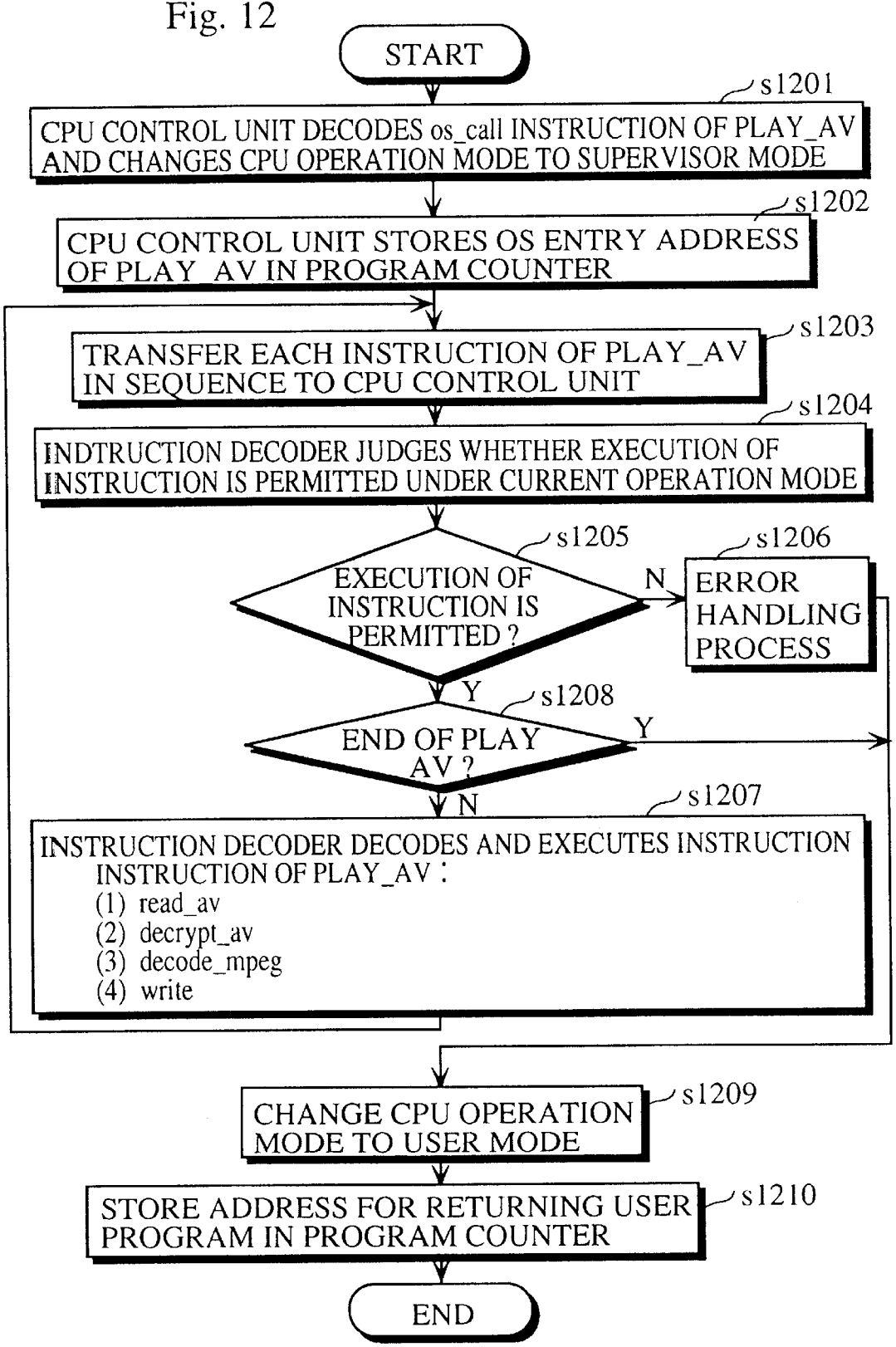
FIG. 12 is a flowchart showing the procedure of reproducing AV data by the present image information processing system.

FIG. 12 is a flowchart showing the procedure of reproducing AV data by the present image information processing system.

Control unit 37, on detecting by controlling display apparatus 71.the request from the user to reproduce AV data, starts executing "os_call#98 (PLAY_)" of user program 86.

Instruction decoding unit 51, on judging that the fetched instruction is system routine "PLAY_AV," saves the operation mode from status register 561 to main memory 374, then updates the value of status register 561 so that the operation mode changes from the user mode to the supervisor mode. This makes flag signal 49, which is output from instruction executing unit 55 to instruction decoding unit 51, indicate the supervisor mode (s1201).

Instruction decoding unit 51 saves the value of program counter 45 to main memory 374 and stores OS entry address 85 of descriptor 84 corresponding to "os_call#98" in descriptor table 81 into program counter 45. This means the entry address of system routine "PLAY_" of OS 82 is stored in program counter 45 (s1202).

Instruction decoding unit 51 reads the read_av instruction, which is at the beginning of system routine "PLAY AV," into instruction register 52 by referring to the value of program counter 45 (s1203).

Instruction decoder 53 judges whether the execution of the read_av instruction stored in instruction register 52 is permitted under the current operation mode. The read_av instruction is the supervisor instruction. Instruction decoder 53, having detected from flag signal 49 input from instruction executing unit 55 that microprocessor 371 is currently in supervisor mode, judges that the execution of the read_av instruction is permitted (s1204 and s1205).

Instruction decoder 53 outputs the address of the microprogram corresponding to the read_av instruction to microprogram memory 54. Microprogram memory 54 transfers the AV data read instruction (dsk_read_av) to disk reproduction drive 35 by outputting the microcodes specified by the address in sequence to bus I/F 683.

Disk reproduction drive 35 reads the digital data specified by the AV data read instruction (dsk_read_av) from DVD-ROM 31. The read digital data is divided into CGMS control data 13 and user data 14 then these pieces of data are respectively stored in CGMS control data memory 402 and user data memory 403. Disk reproduction drive 35 encrypts the digital data stored in user data memory 403 by using encryption circuit 406 and outputs to control unit 37 the data in a data transfer unit of 2,054 bytes which is a total of the CGMS control data (6 bytes) and the user data (2,048 bytes). In this way, encrypted MPEG data is stored in main memory 374 of control unit 37 (s1207-(1)).

Instruction decoding unit 51 of control unit 37 increments the address value of program counter 45 then reads the decrypt_av instruction into instruction register 52 (s1203).

Instruction decoder 53 judges whether execution of the decrypt_av instruction stored in instruction register 52 is permitted under the current operation mode. The decrypt_av instruction is the supervisor instruction. Instruction decoder 53, having detected from flag signal 49 input from instruction executing unit 55 that microprocessor 371 is currently in supervisor mode, judges that the execution of the decrypt_av instruction is permitted (s1204 and s1205).

Instruction decoder 53 outputs the address of the microprogram corresponding to the decrypt_av instruction to microprogram memory 54. Microprogram memory 54 decrypts the encrypted MPEG data stored in main memory 374 by outputting the microcodes specified by the address in sequence to instruction executing unit 55 (s1207-(2)).

Instruction decoding unit 51 further increments the address value of program counter 45 then reads the decode_mpeg instruction into instruction register 52 (s1203).

Instruction decoder 53 judges whether execution of the decode_mpeg instruction stored in instruction register 52 is permitted under the current operation mode. Instruction decoder 53 judges that the execution of the decode_mpeg instruction is permitted since the instruction is the user instruction (s1204 and s1205).

Instruction decoder 53 outputs the address of the microprogram corresponding to the decode_mpeg instruction to microprogram memory 54. Microprogram memory 54 decodes crypts the decrypted MPEG data stored in main memory 374 by outputting the microcodes specified by the address in sequence to instruction executing unit 55 to convert the data into image data and voice data (s1207-(3)).

Instruction decoding unit 51 further increments the address value of program counter 45 then reads the write instruction into instruction register 52 (s1203).

Instruction decoder 53 judges whether execution of the write instruction stored in instruction register 52 is permitted under the current operation mode. Instruction decoder 53 judges that the execution of the write instruction is permitted since the instruction is the user instruction (s1204 and s1205).

Instruction decoder 53 outputs the address of the microprogram corresponding to the write instruction to microprogram memory 54. Microprogram memory 54 outputs the image data and voice data stored in main memory 374 to video signal processing unit 67 by outputting the microcodes specified by the address in sequence to bus I/F 683.

Video signal processing unit 67 converts the input image data and voice data into an image signal and a voice signal then outputs the signals to display apparatus 71 and speaker 60 for image and voice outputs (s1207-(4)).

At the last stage in this process, the os_return instruction, which is the last instruction in the system routine PLAY_AV, is executed (s1208).

Instruction decoding unit 51, on decoding the os_return instruction, returns the operation mode from main memory 374 to status register 561. The operation mode having been saved is the user mode. This makes flag signal 49, which is output from instruction executing unit 55 to instruction decoding unit 51, indicate the user mode (s1209).

Instruction decoding unit 51 returns the address value having been saved in main memory 374 to program counter 45 to allow control to return to user program 86 which has called the os_call#98 instruction (s1210).

Figure 13:
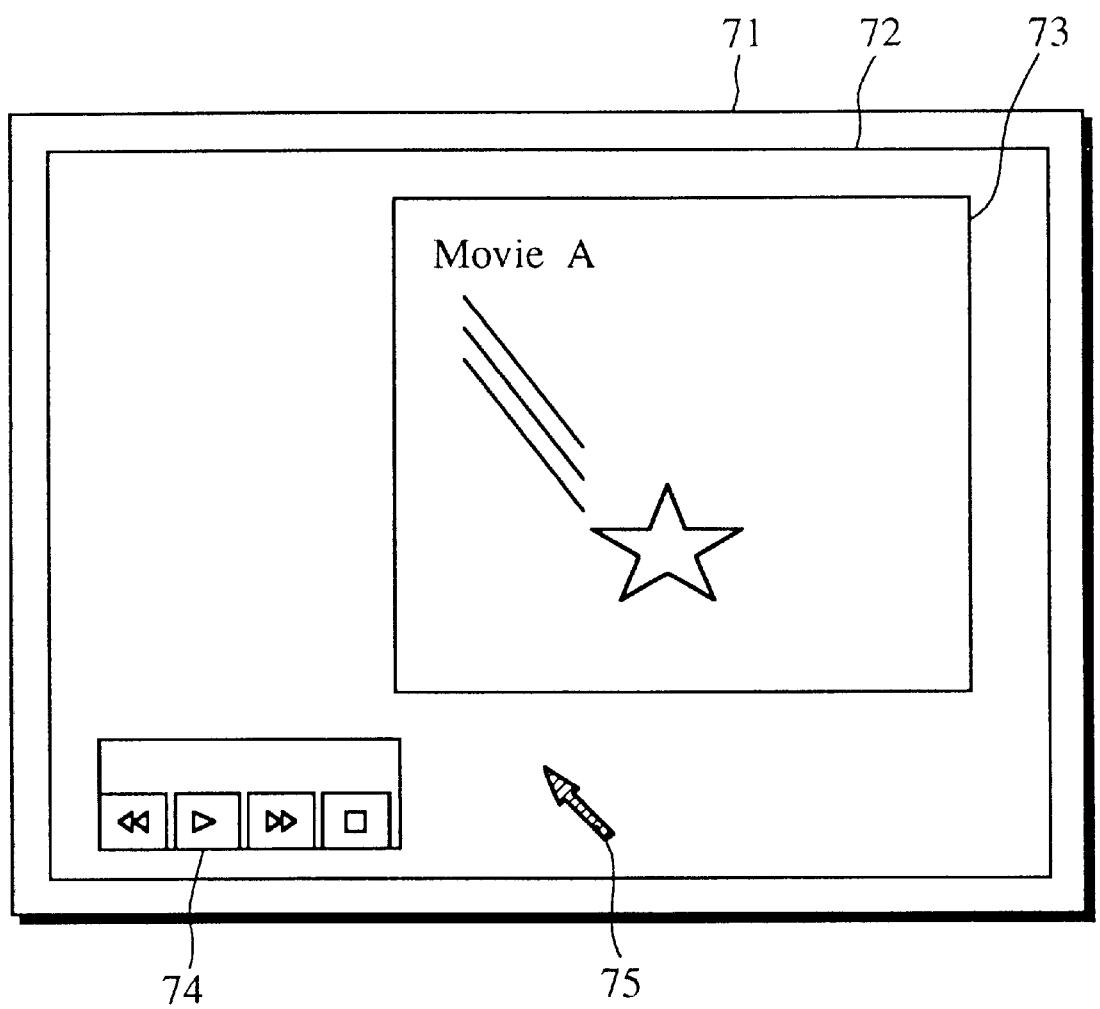
FIG. 13 shows a screen displayed on display apparatus 71 when the AV data is reproduced as above.

FIG. 13 shows a screen displayed on display apparatus 71 when the AV data is reproduced as above.

As shown in FIG. 13, a scene of a shooting star in a movie is displayed on MPEG moving picture display area 73 in display area 72 of display apparatus 71. Control panel 74 and mouse pointer 75 are displayed at the same time in the lower-left part of display area 72. The user can reproduce AV data in an interactive manner by clicking the buttons on control panel 74 with mouse 70.

*1.2.2 Copy of Non-AV Data

Now, the operation of the present image information processing system in copying non-AV data is described, mainly on the parts of it different from those in reproducing AV data.

Control unit 37, on detecting by controlling display apparatus 71 the request from the user to reproduce non-AV data, starts executing "os_call#99 COPY" of user program 86.

The operation of microprocessor 371 is not limited by the operation mode since system routine "COPY" is, as shown in FIG. 11, comprised of only user instructions (the read instruction and the write instruction).

Instruction decoding unit 51, on decoding the write instruction, writes the digital data in control unit 37 to the copy destination apparatus such as hard disk apparatus 64.specified by the data read instruction (dsk_read) from DVD-ROM 31. The read digital data is divided into CGMS control data 13 and user data 14 then these pieces of data are respectively stored in CGMS control data memory 402 and user data memory 403.

Microprocessor 409 judges whether the user data stored in user data memory 403 is AV data by using. CGMS data identify circuit 404. If judged as non-AV data, microprocessor 409 outputs the user data to control unit 37.

If judged as AV data, microprocessor 409 converts the user data 14 into NULL data as a copyright protection process and outputs the NULL data to control unit 37.

Instruction decoding unit 51, on decoding the write instruction, writes the digital data sent to control unit 37 to a copy destination apparatus, for example, hard disk apparatus 64, specified by the write instruction.

In this way, the present image information processing system, on receiving a user request to copy a non-AV file, copies the specified file if the file consists of non-AV data; virtually prevents the specified file from being copied by converting the data into NULL data if the file consists of AV data. This procedure is executed for preventing the copyright infringement where the user illegally copies an AV files although the user is permitted to copy only non-AV files.

*1.3 Summary

As is described above, microprocessor 371 of the present image information processing system includes instructions suitable for reproducing MPEG data ("read_av," "decrypt_av," "decode_mpeg," and the like) as well as instructions included in general-purpose microprocessors. The present image information processing system works as a highly functional AV data reproducing system due to the simple application programs including such instructions and accordingly does not require such an independent card module as MPEG decoder 63 which has been required in conventional image information processing system. This makes it easier to achieve a reproduction system with decoding by software instead of conventional decoding by hardware.

In the present image information processing system, the read_av, decrypt_av, and decode_mpeg instructions are inseparably executed in a system routine 83, the read_av instruction being used to read AV data stored in DVD-ROM 31, the decrypt_av instruction to decrypt the read AV data, and the decode_mpeg instruction to decode the decrypted AV data. Accordingly, the above construction prevents the illegal action or the malfunction where the MPEG data stored in DVD-ROM 31 is copied to another apparatus without being decoded, which is a worst case where compressed MPEG data is used for another purpose without being decompressed.

In the present image information processing system, the AV data output from disk reproduction drive 35 has been encrypted. This prevents illegal reading of AV data through I/O bus 66 or illegal use of AV data remaining in main memory 374 without being decrypted after being read from disk reproduction drive 35 for some reason.

Microprocessor 371 of the present embodiment defines the read_av instruction as the supervisor instruction and is executed only when microprocessor 371 is in the supervisor mode. As a result, microprocessor 371 does not execute the read_av instruction since user program 86 operates under the user mode even if the read_av instruction is executed separately from MPEG data decoding due to an error in user program 86. This prevents a malfunction where an AV file is read into main memory 374 without being reproduced as images.

Microprocessor 371 of the present embodiment defines the decrypt_av instruction as the supervisor instruction and is executed only when microprocessor 371 is in the supervisor mode, the decrypt_av instruction being used to decrypt encrypted digital data. As a result, microprocessor 371 does not execute the decrypt_av instruction since user program 86 operates under the user mode even if digital data being transferred remains in main memory 374 or hard disk apparatus 64 and the decrypt_av instruction is executed separately from MPEG data decoding due to an error in user program 86. This prevents a malfunction where an AV file is decrypted without being reproduced as images.

In the present embodiment, microprocessor 371 issues the AV data read instruction (dsk_read_av) to disk reproduction drive 35 via I/O bus 66 during the execution of the read_av instruction of system routine "PLAY_AV." However, the present invention is not limited to such a route. Disk reproduction drive 35 may include, for example, an independent circuit for issuing the AV data read instruction so that the issuance of the AV data read instruction is prevented by inputting a signal line indicating the operation status of microprocessor 371 to the independent circuit when microprocessor 371 is in the user mode.

In the present embodiment, system routine "PLAY_AV" includes the write instruction. However, the write instruction may not be included in system routine "PLAY_AV." This is because the case where encrypted and compressed MPEG data remains in main memory 374 is avoided if at least each of the read_av and decryt_av instructions is executed together with the decode_mpeg instruction. However, it is not realistic to record the whole decoded AV data into a secondary storage apparatus since the amount of the AV data is great. Therefore, it is thought that for general application programs, system routine "PLAY_AV" of the present embodiment including the write instruction is convenient.

*2. Second Embodiment

The image information processing system of the second embodiment is described below, the system being characterized by a microprocessor for executing the AV data reproduction instruction comprised of microprograms for preventing the illegal copy of works.

*2.1 Construction of Image Information Processing System

The construction of the present image information processing system of the second embodiment is basically the same as that of the first embodiment other than microprogram memory 104 which includes microprograms different from those of microprogram 54 of the first embodiment.

*2.1.1 Microprogram Memory 104

Figure 14:
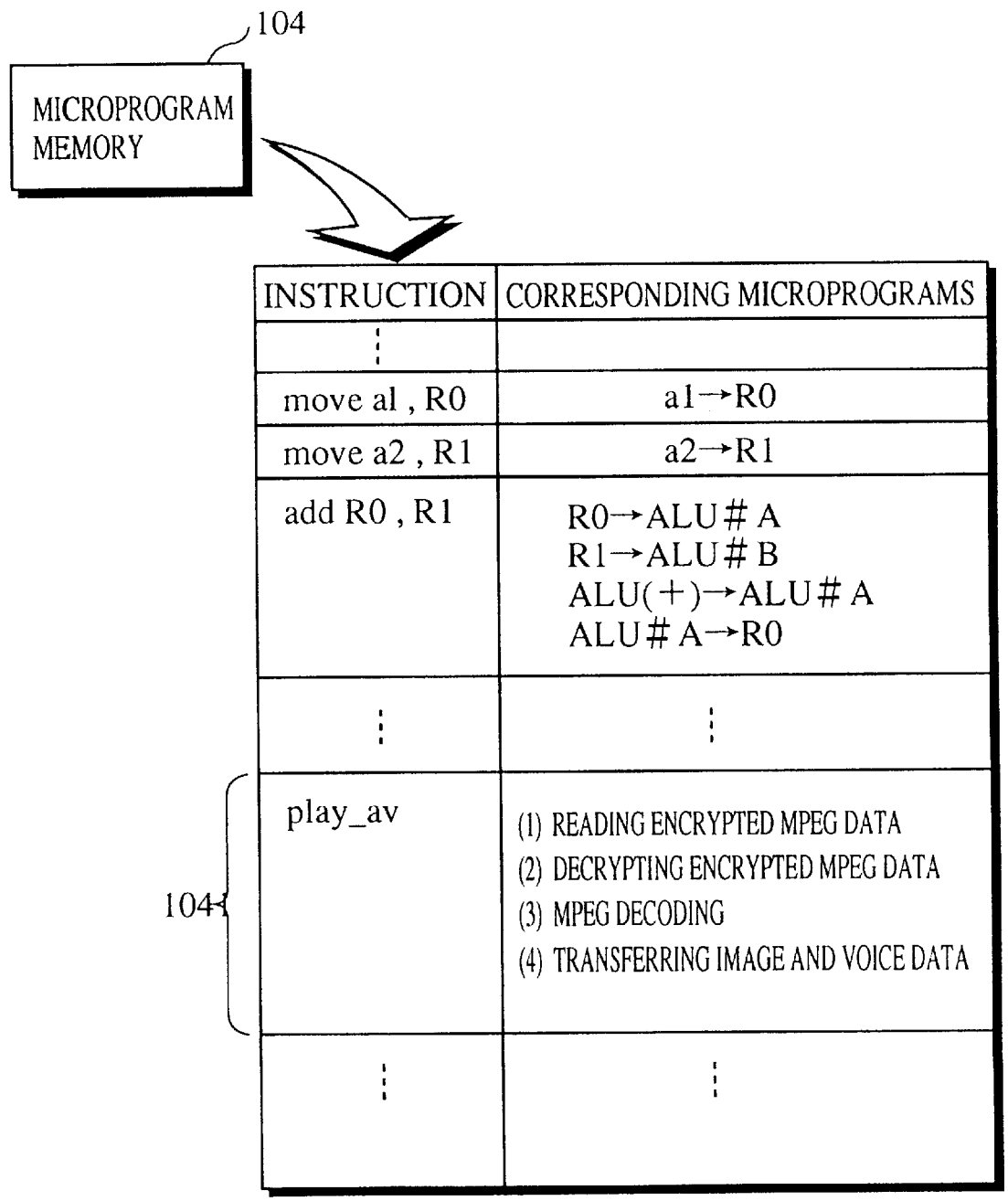
FIG. 14 shows the instructions and microprograms corresponding to the instructions stored in microprogram memory 104 of the second embodiment.

FIG. 14 shows the instructions and microprograms corresponding to the instructions stored in microprogram memory 104.

As shown in the drawing, the play_av instruction 1041 is comprised of four main microprograms for executing the following processes; (1) reads encrypted MPEG data from DVD-ROM 31 to main memory 374 by issuing the dsk_read_av instruction to disk reproduction drive 35; (2) decrypts the read MPEG data; (3) decodes the decrypted MPEG data; and (4) transfers the image data and voice data obtained through the decoding to video signal processing unit 67.

The play_av instruction 1041 is defined as the user instruction.

The read_av instruction and decrypt_av instruction defined in microprogram memory 54 of the first embodiment are not defined the present embodiment. That is, the read_av, decrypt_av, and decode_mpeg instructions, which are defined in the first embodiment as independent instructions, are combined into a play_av instruction in the second embodiment.

*2.2 Operation of Image Information Processing System

Figure 15:
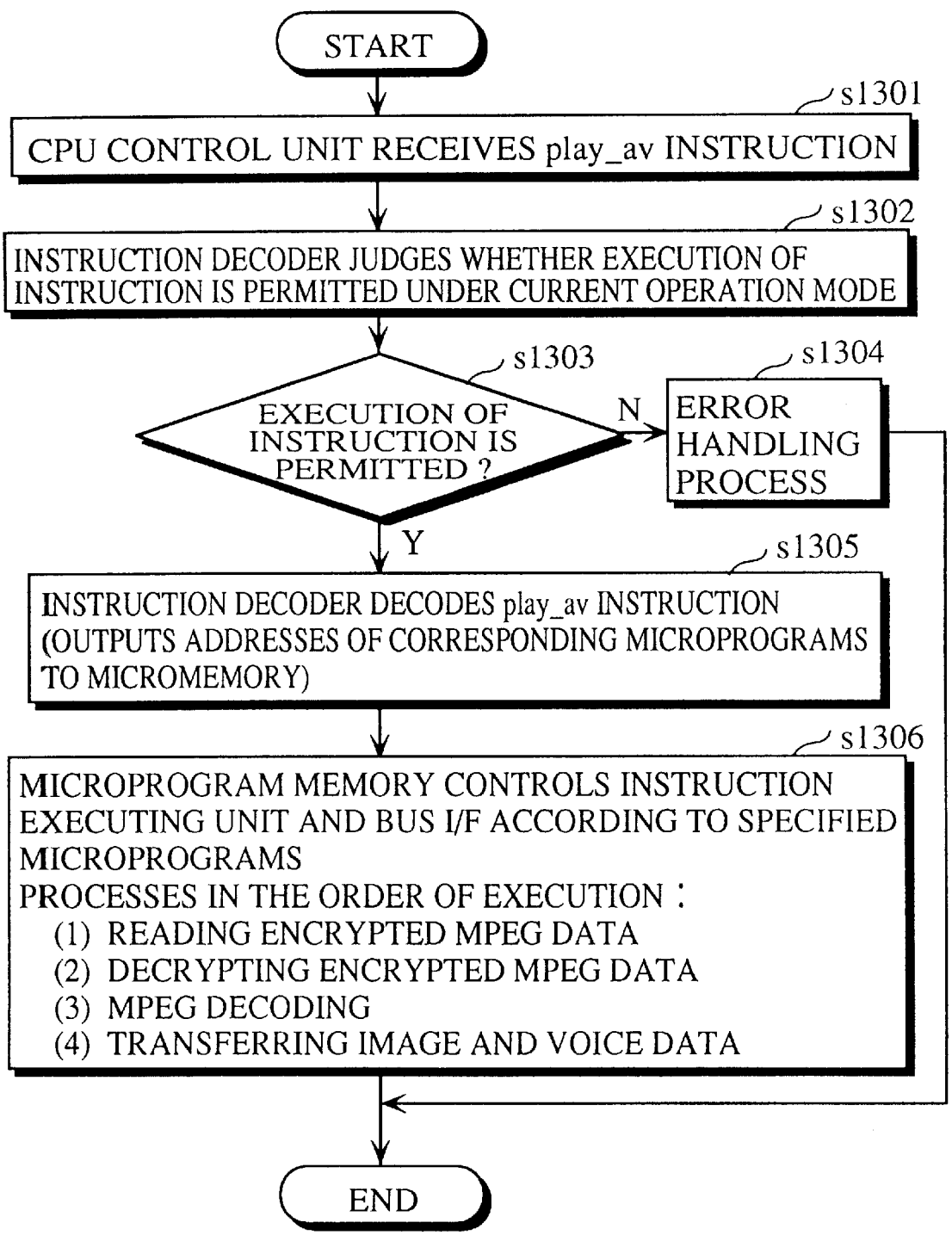
FIG. 15 is a flowchart showing the procedure of the present image information processing system when the play_av instruction is executed.

FIG. 15 is a flowchart showing the procedure of the present image information processing system when the play_av instruction in user program 86 is executed.

Instruction register 52 fetches the play_av instruction from main memory 374 (s1301).

Instruction decoder 53 judges whether the execution of the play_av instruction stored in instruction register 52 is permitted under the current operation mode (s1302).

Instruction decoder 53 judges that the execution of the play_av instruction is permitted since the operation mode is the user mode and the play_av instruction is the user instruction (s1303).

Instruction decoder 53 outputs the address of the microprogram corresponding to the play_av instruction to microprogram memory 104 (s1305).

Microprogram memory 104 outputs the series of microprograms of the play_av instruction according to the input addresses (s1305).

Control unit 37 executes as follows; (1) reads encrypted MPEG data from DVD-ROM 31 to main memory 374 by issuing the dsk_read_av instruction to disk reproduction drive 35; (2) decrypts the read MPEG data; (3) decodes the decrypted MPEG data; and (4) transfers the image data and voice data obtained through the decoding to video signal processing unit 67 (s1306).

In this way, the user can reproduce AV data through interactive operations with the present image information processing system as in the first embodiment.

*2.3 Summary

As is described above, microprocessor 371 of the present embodiment uses a "play_av" instruction defined in microprogram memory 104 which performs the same operation as that of system routine "PLAY_AV" of the first embodiment, and the read_av instruction and the decrypt_av instruction are not defined in microprogram memory 104 of the present embodiment.

Accordingly, the user cannot separate the reading of AV data from disk reproduction drive 35 and decrypting of it from decoding of it. That is, the user can read and decrypt MPEG data of disk reproduction drive 35, but not copy MPEG data, having been compressed without MPEG decoding, to another apparatus, which is an illegal action.

The image information processing systems of the present embodiment and the first embodiment have in common, namely, preventing the illegal copy of digital works and the copyright infringement by a malfunction. However, they differ in the level of protection.

The image information processing system of the first embodiment operates on the assumption that the illegal person does not have means for changing the operation mode to the supervisor mode and that the malfunction occurs in the user mode. In contrast, the present embodiment need not assume as above to prevent such illegal actions and copyright infringement.

The reason for the above is that in the present embodiment, the "play_av" instruction itself is defined as the user instruction and that the processes of reading, decrypting, and decoding of AV data are written as inseparable processes in a ROM, called microprogram memory 104, in microprocessor 371.

Accordingly, the user cannot execute microprograms of the "play_av" instruction partially, nor change the contents of microprogram memory 104.

An interrupt request input from an external apparatus to microprocessor 371 is received by instruction decoder 53 after the execution of an instruction completes, that is, after the execution of all the microprograms of the instruction completes. Therefore, the above three processes are not executed separately even when an interrupt request is issued during an execution of the "play_av" instruction.

In the present embodiment, disk reproduction drive 35 encrypts a piece of digital data, namely, a piece of AV data to be transferred, then outputs the encrypted digital data to control unit 37. Control unit 37 decrypts and decodes the digital data with the MPEG decoding. As a result, system routine PLAY_AV dedicated to image reproduction includes a microprogram that decrypts encrypted data. However, system routine PLAY_may not require such a decryption process if the system routine executes reading of AV data and MPEG decoding inseparably as far as disk reproduction drive 35 outputs not-encrypted AV data.

In the present embodiment, microprogram 104 does not store the read_av instruction of the first embodiment. However, microprogram 104 may store the read_av instruction as the supervisor instruction only to prevent the case where user program 86 reads AV data without decoding the AV data with the MPEG decoding.

*3. Third Embodiment

The image information processing system of the third embodiment is described below, the system being a modification of the second embodiment and being characterized by a method for avoiding a case where an interrupt request is not received for a long time.

*3.1 Construction of Image Information Processing System

The construction of the present image information processing system of the third embodiment is basically the same as that of the second embodiment other than microprogram memory 114 which includes microprograms different from those of microprogram 104 of the first embodiment.

*3.1.1 Microprogram Memory 114

Figure 16:
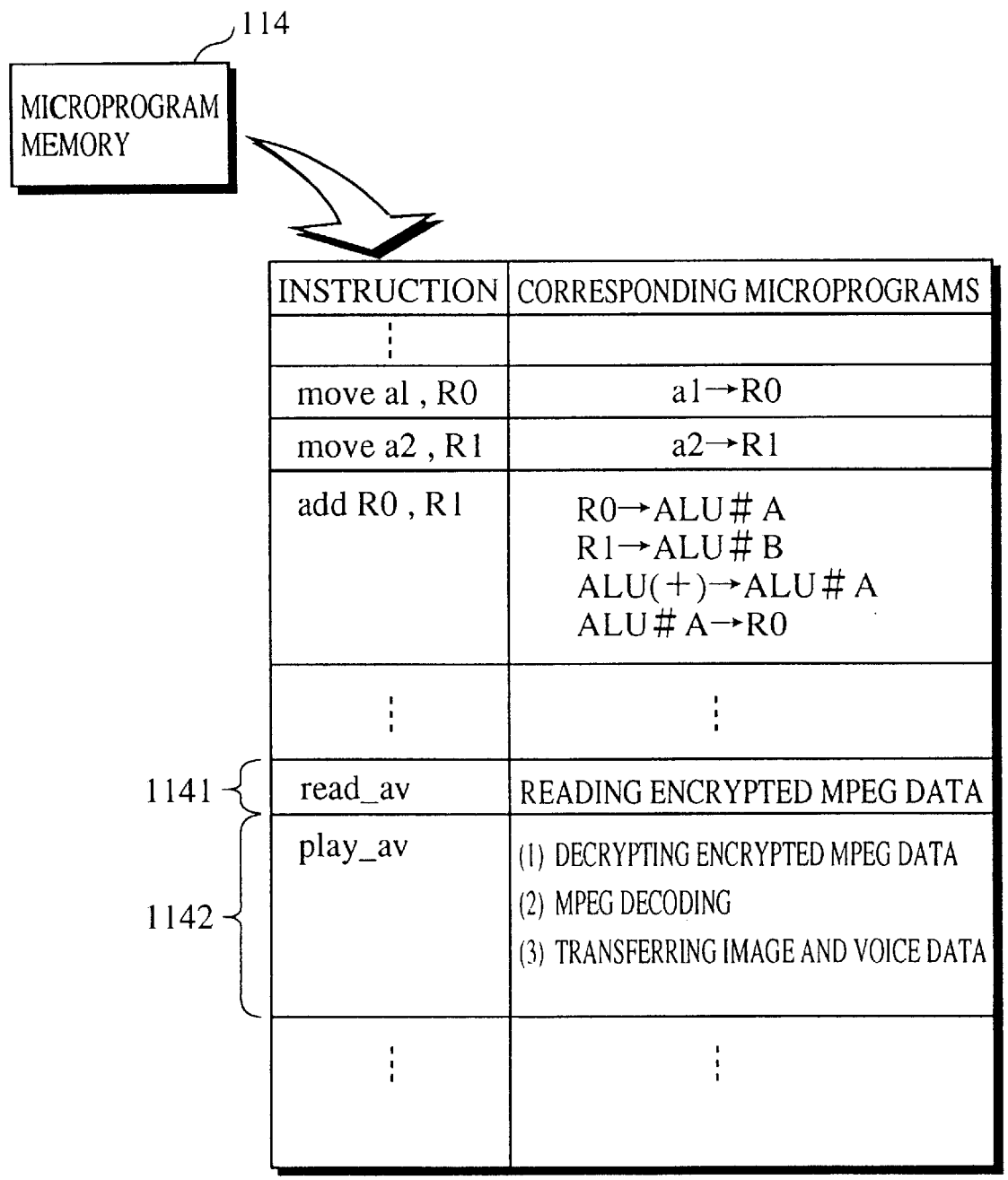
FIG. 16 shows the instructions and microprograms corresponding to the instructions stored in microprogram memory 114 of the third embodiment.

FIG. 16, corresponding to FIG. 14 of the second embodiment, shows the instructions and microprograms corresponding to the instructions stored in microprogram memory 114.

In the second embodiment, as shown in FIG. 14, the play av instruction 1041 is comprised of four main microprograms for executing the respective processes. In the present embodiment, as shown in FIG. 16, the play_av instruction 1042 is comprised of three main microprograms for executing the following processes; (1) decrypts MPEG data read into main memory 374; (2) decodes the decrypted MPEG data; and (3) transfers the image data and voice data obtained through the decoding to video signal processing unit 67.

Also, in the present embodiment, the read_av instruction, which is not defined in the second embodiment, is defined in microprogram memory 114.

The read_av instruction of the present embodiment is equivalent to that of the first embodiment and is comprised of the microprograms for reading encrypted MPEG data from DVD-ROM 31 by issuing the dsk_read_av instruction to disk reproduction drive 35.

As understood from the above description, the play_av instruction 1041 of the second embodiment is divided into the read_av instruction 1141 and the play_av instruction 1142 of the present embodiment.

Note that the read_av instruction and the play_av instruction are defined as the user instructions.

An interrupt request input from an external apparatus to microprocessor 371 is received by instruction decoder 53 after the execution of an instruction completes, that is, after the execution of all the microprograms of the instruction completes, which is the same as in the second embodiment.

*3.2 Operation of Image Information Processing System

Figure 17:
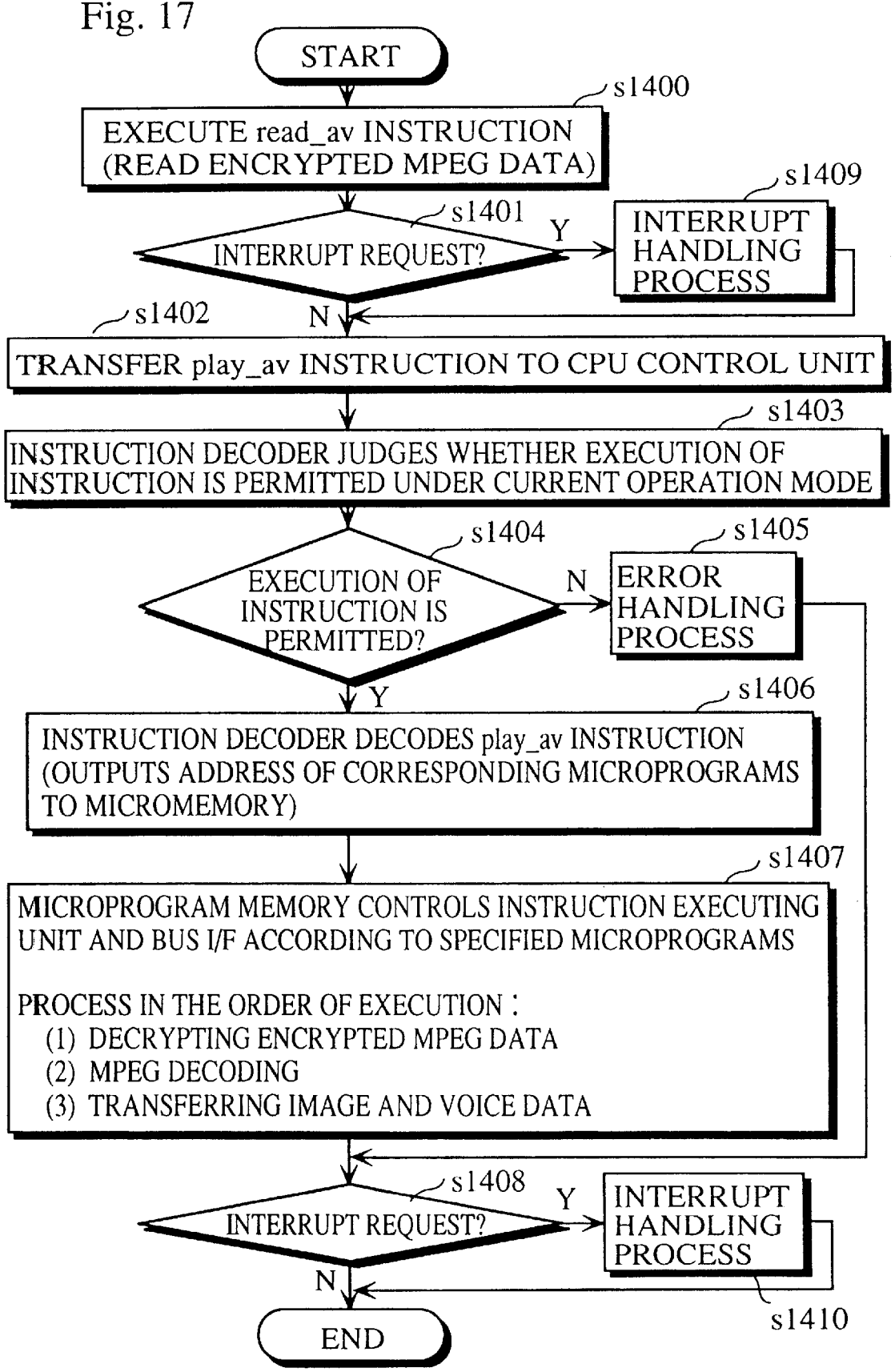
FIG. 17 is a flowchart showing the procedure of the present image information processing system when the read_av instruction and the play_av instruction are executed.

FIG. 17 is a flowchart showing the procedure of the present image information processing system when the read_av instruction and the play av instruction in user program 86 are executed.

When the read_av instruction in user program 86 is fetched by microprocessor 371, the microprograms of the read av instruction is executed (s1400). This allows control unit 37 to output the AV data read instruction (dsk_read_av) to disk reproduction drive 35. The encrypted AV data read from disk reproduction drive 35 is stored in main memory 374 (s1400).

When the execution of the microprograms of the read_av instruction completes, instruction decoder 53 judges whether an interrupt request has been issued (s1401). If issued, an interrupt handling process is performed (s1409). In this case, another process is performed between the processes for the read av and play_av instructions since there is a waiting time after the read_av instruction is executed to issue the AV data read instruction (dsk_read_av) to disk reproduction drive 35 and before the AV data is output from disk reproduction drive 35 then finally be stored in main memory 374 (s1409).

After the encrypted AV data is stored in main memory 374, the play_av instruction in user program 86 is read cut to instruction register 52 (s1402).

Instruction decoder 53 judges whether the execution of the play_av instruction is permitted under the current operation mode (s1403 and s1404). Instruction decoder 53 judges that the execution is permitted since the current operation mode is the user mode, which is specified by flag signal 49 sent from instruction executing unit 55, which is also apparent from the fact that user program 86 is currently executed, and the play_av instruction is the user instruction.

Instruction decoder 53 outputs the address of the microprograms corresponding to the play_av instruction to microprogram memory 114 (s1406).

Microprogram memory 114 outputs a microcode being comprised of the series of microprograms of the play_av instruction according to the input address (s1407). This allows the encrypted AV data to be decrypted and decoded with MPEG decoding to generate image data and voice data. The image data and voice data are transferred to video signal processing unit 67 and images and voices are output (s1407 (1)–(3))

Instruction decoder 53 checks to see if an interrupt request has been issued after the execution of the microprograms of play av instruction completes (s1408). If issued, an interrupt handling process is executed (s1410).

*3.3 Summary

As is described above, different from the second embodiment, the read_av instruction for reading encrypted MPEG data and the play_av instruction for reproducing the read MPEG data are defined in microprogram memory 114 as independent instructions. This shortens the waiting time before an interrupt request is executed, compared to the second embodiment. With this improvement, in a parallel execution of AV data reproduction and other processes, the realtime operation is improved.

As the second embodiment, the third embodiment prevents such illegal actions or copyright infringement as copying the decrypted MPEG data to another apparatus without decoding with MPEG decoding by using an interrupt request since the decryption of encrypted MPEG data and MPEG decode are defined as the inseparable microprograms in the play_av instruction.

In the present embodiment, microprogram memory 114 does not store the decrypt_av instruction of the first embodiment. However, microprogram 114 may store the decrypt_av instruction as the supervisor instruction only to prevent the case where user program 86 reads AV data without decoding the AV data with the MPEG decoding.

The play_av instruction of the present embodiment includes a microprogram for transferring data to video signal processing unit 67. However, the play_av instruction may not include the microprogram if the play_av instruction at least includes the processes of decrypting encrypted data and MPEG decoding. This is because such an arrangement is enough for such application creators as think that only the copyright of MPEG data should be protected since it is not realistic to record the whole MPEG-decoded AV data, whose amount is great, into a secondary storage apparatus.

In all of the above embodiments, control unit 37 includes IDCT (Inverse Discrete Cosine Transform) unit 58 in microprocessor 371 as a circuit dedicated to MPEG decoding of AV data. However, the IDCT unit 58 may be replaced with DSP (Digital Signal Processor) or the like as far as control unit 37 performs MPEG decoding. Furthermore, it is needless to say such a dedicated circuit may not be necessary if microprocessor 371 itself has a high operation performance. In these embodiments, IDCT unit 58 is a dedicated circuit in microprocessor 371. However, IDCT unit 58 (or DSP) may be achieved in an independent peripheral chip as a dedicated circuit assisting the MPEG decoding.

Similarly, control unit 37 includes decryption unit 59 in microprocessor 371 as a circuit decated to decryption of AV data. However, the decryption unit 59 may be replaced with DSP or the like as far as control unit 37 performs the decryption. Furthermore, it is needless to say such a dedicated circuit may not be necessary if microprocessor 371 itself has a high operation performance. In these embodiments, decryption unit 59 is a dedicated circuit in microprocessor 371. However, decryption unit 59 (or DSP) may be achieved in an independent peripheral chip as a dedicated circuit assisting the decryption.

In all of the above embodiments, disk reproduction drive 35 outputs NULL data if it receives the data read instruction (dsk_read) which requests AV data to be output, as a copyright protection process. However, instead, the output of the AV data may be stopped.

In all of the above embodiments, control unit 37 transfers image and voice data to video signal processing unit 67 via I/O bus 66 after MPEG decoding. However, another data transmission path may be used instead of I/O bus 66. A dedicated data line, for example, may be set between control unit 37 and video signal processing unit 67 so that the image and voice data are transferred via the dedicated data line.

*4. Fourth Embodiment

The image information processing system of the fourth embodiment is described below, the system being characterized by a method for preventing accesses to a specific data area.

*4.1 Construction of Image Information Processing System

The construction of the present image information processing system of the fourth embodiment is basically the same as that of the first embodiment other than instruction decoding unit 151 replacing instruction decoding unit 51 of the first embodiment.

*4.1.1 Instruction decoding unit 151

Figure 18:
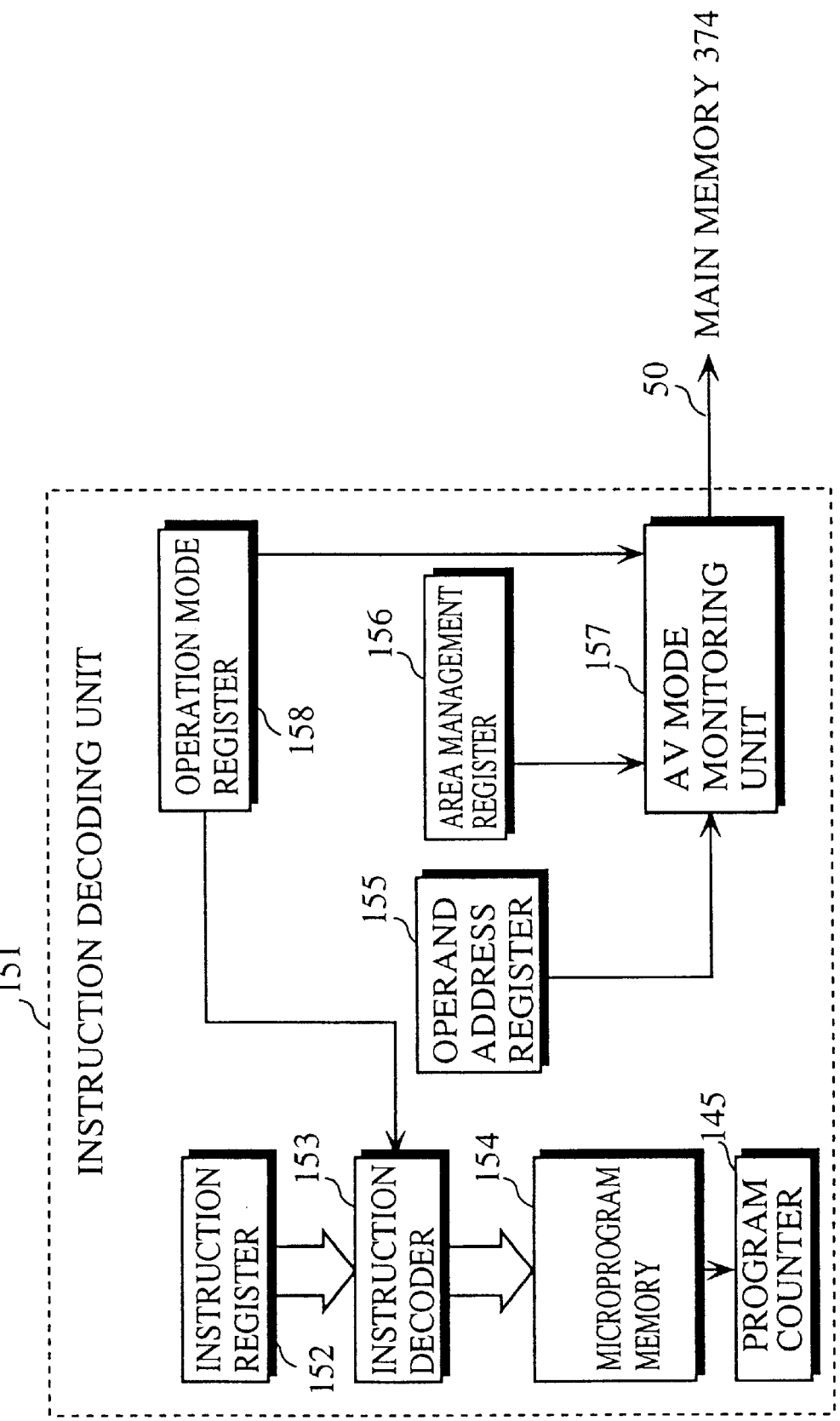
FIG. 18 is a block diagram showing the construction of instruction decoding unit 151 of microprocessor 371 of the image information processing system of the fourth embodiment.

FIG. 18 is a block diagram showing the construction of instruction decoding unit 151 of microprocessor 371 of the present image information processing system.

Instruction decoding unit 151 is comprised of instruction register 152, instruction decoder 153, microprogram memory 154, operand address register 155, area management register 156, AV mode monitoring unit 157, operation mode register 158, and program counter 145.

Operation mode register 158 stores information used to identify the current operation mode of microprocessor 371. The operation mode is divided into three modes: supervisor mode, user mode, and AV mode.

The user mode allows user program 86 to run and prohibits the execution of certain instructions.

The supervisor mode allows the operation system to run and does not prohibit any instruction executions. There are such instructions as may interrupt the operation of microprocessor 371 such as the STOP instruction for stopping the operation of microprocessor 371 and the RESET instruction for resetting the status. For such instructions, the privilege level is set to the supervisor mode so that such instructions are used only by the operating system.

The AV mode is an operation mode dedicated to processing of AV data. More specifically, the AV mode allows the instructions the execution of which is prohibited in the user mode to be executed. The instructions the execution of which is prohibited in the user mode are: execution of an instruction for obtaining AV data (digital) and loading the obtained AV data into main memory 374; execution of an instruction for decrypting the encrypted digital data of main memory 374; calculation for MPEG decoding; execution of an instruction for transferring image and voice data obtained through MPEG decoding to video signal processing unit; etc.

Instruction register 152 fetches an instruction from main memory 374 from a location specified by the address value of program counter 145.

Figure 19:
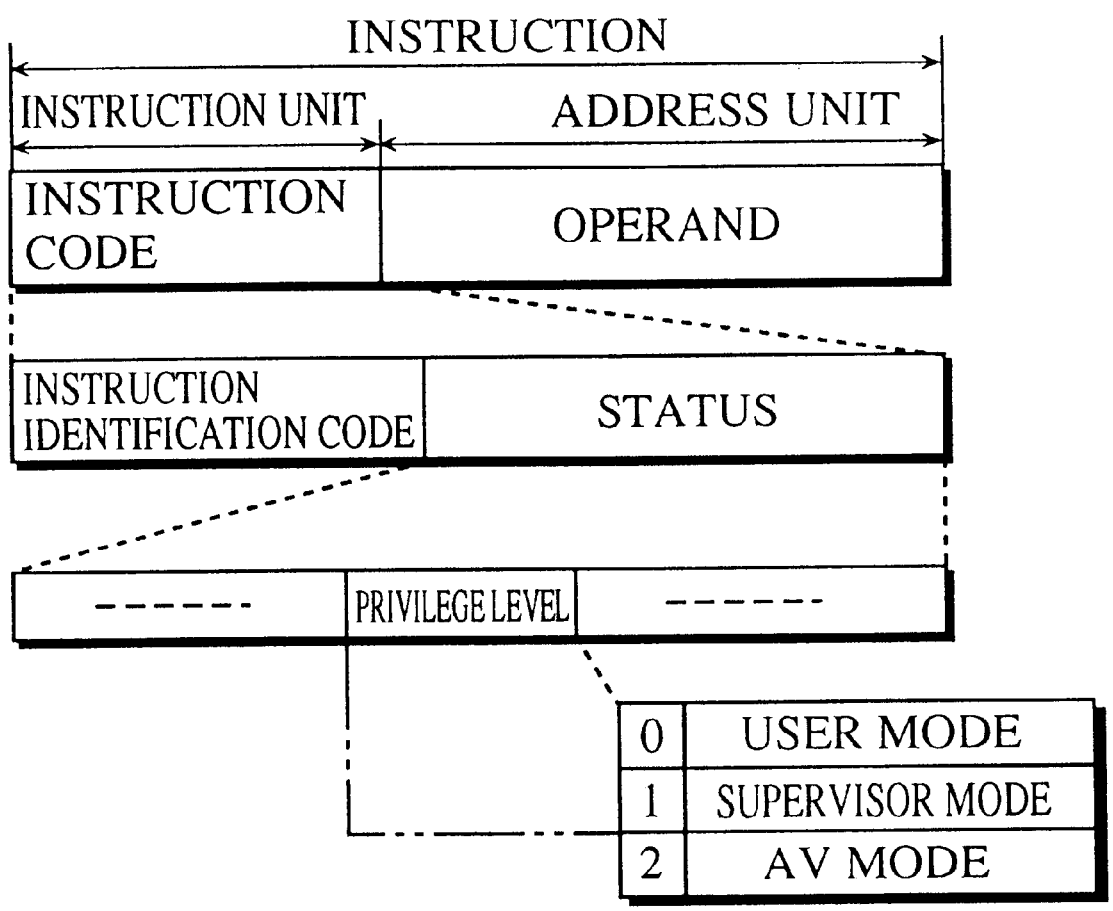
FIG. 19 shows the format of the instruction executed by microprocessor 371 of the fourth embodiment.

FIG. 19, corresponding to FIG. 9(a) of the first embodiment, shows the format of the instruction executed by microprocessor 371 of the present embodiment.

The format of the present embodiment differs from that of the first embodiment in that the privilege level has two bits for specifying any of the above three modes. The instruction with privilege level "2" is called the AV. mode instruction.

Instruction decoder 153 judges whether a privilege infringement occurs by comparing the privilege level of the instruction stored in instruction register 152 with the operation mode stored in operation mode register 158.

FIG. 20 shows the operation modes and the instructions whose executions are permitted under the operation modes.

Instruction decoder 153 judges that a privilege infringement has happened if, under an operation mode, instruction register 152 fetches an instruction other than the instructions shown in the right-hand column of the mode. If judged as a privilege infringement, the instruction is not decoded and only a certain error handling process is performed.

If judged as not a privilege infringement, instruction decoder 153 decodes the instruction fetched by instruction register 152 and outputs in sequence to microprogram memory 154 the addresses in microprogram memory 154 of the microprograms that are internal programs of microprocessor 371.

Microprogram memory 154 prestores microcodes called microprograms for controlling the ALU unit and the register set. The microcodes are signals that directly control the components of microprocessor 371 such as data transfers between registers, calculation instructions, and comparison.

FIG. 21, corresponding to FIG. 9(b) of the first embodiment, shows the types of instructions and the corresponding privilege levels which are defined in microprogram memory 154.

The fourth embodiment differs from the first embodiment in that the read_av instruction and the decrypt_av instruction are defined as the AV mode instructions.

Operand address register 155 stores addresses in instructions register 152 of the operands (hereinafter called operand addresses) used in the instructions.

Area management register 156 stores information that specifies a certain area called the AV data area in main memory 374.

Figure 22:
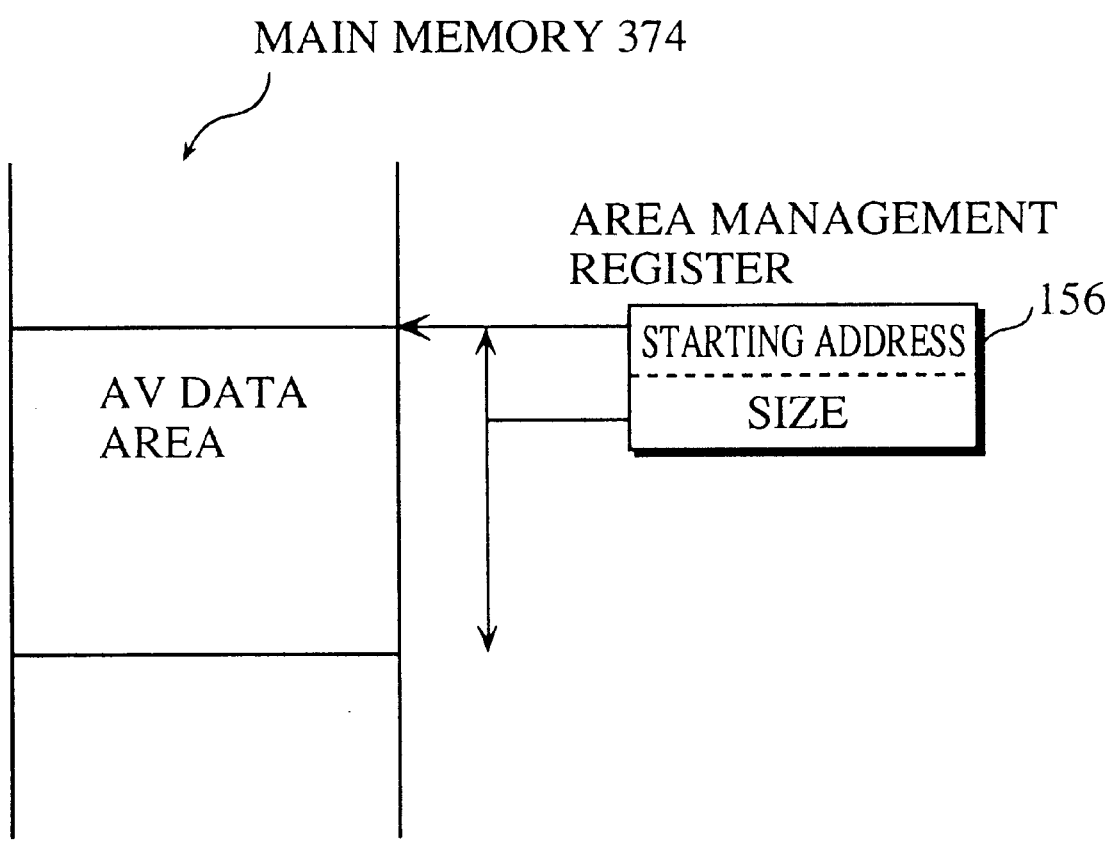
FIG. 22 shows the relation between area management register 156 and main memory 374.

FIG. 22 shows the relation between area management register 156 and main memory 374.

Area management register 156 stores a pair of the starting address and the size of the AV data area storing AV data.

If the operand address stored in operand address register 155 is in an area managed by area management register 156: AV mode monitoring unit 157 lets an operand address pass and reach main memory 374 only when operation mode register 158 stores the AV mode; otherwise AV mode monitoring unit 157 does not let the operand address pass.

If the operand address stored in operand address register 155 is out of the area managed by area management register 156, AV mode monitoring unit 157 lets all operand addresses pass and reach main memory 374 regardless of the value stored in operation mode register 158.

*4.2 Operation of Microprocessor 371

The operation of microprocessor 371 constructed as above is described below.

Instruction register 152 fetches an instruction specified by program counter 145 used in user program 86 loaded into main memory 374.

Instruction decoder 153 then judges whether a privilege infringement occurs by comparing the privilege level of the instruction stored in instruction register 152 with the operation mode stored in operation mode register 158.

If judged as a privilege infringement, the instruction is not decoded and only a certain error handling process is performed.

If judged as not a privilege infringement, instruction decoder 153 decodes the instruction fetched by instruction register 152 and outputs in sequence to microprogram memory 154 the addresses in microprogram memory 154 of the microprograms that are internal programs of microprocessor 371.

Suppose, here, that the current operation mode is the user mode and that the write instruction is executed to access AV data outside the AV data area.

AT this stage, from the above conditions, operation mode register 158 stores information indicating the user mode and operand address register 155 stores an address in the AV data area.

Instruction decoder 153 judges that a privilege infringement does not occur since the current operation mode is the user mode and the write instruction is the user instruction and starts executing the write instruction.

On the other hand, AV mode monitoring unit 157 prohibits the operand address from being output to main memory 374 since the operand address stored in operand address register 155 is in the AV data area and the value of operation mode register 158 indicates the user mode.

With this construction, microprocessor 371 is prohibited from accessing the AV data area by the user instruction such as the write instruction. That is, data is read/written into/from the AV data area only when the operation mode is AV mode and the AV instruction is executed.

*4.3 Summary

As is described above, microprocessor 371 of the present embodiment runs under the AV mode as well as under the supervisor mode or the user mode. The execution of instructions dedicated to processing of AV data is permitted only under the AV mode. This makes it easier to limitate the execution of instructions dedicated to processing of AV data, achieving the image information processing system suitable for the copyright protection of digital works using MPEG data and the like.

AV mode monitoring unit 157 prohibits the accesses to the AV data area under a non-AV mode even if an instruction without the privilege infringement. Accordingly, accesses to a certain area in main memory 374 is limited. With this construction, for example, when encrypted MPEG data read from DVD-ROM 31 is stored in the AV data area after being decrypted, the MPEG data is prohibited from being copied to another apparatus illegally with the write instruction.

In the present embodiment, the starting address and the size, which can be set in area management register 156, are not limited. However, these values may be fixed.

It is needless to say that the instructions for changing the values of area management register 156 should be the AV instructions and the supervisor instructions.

In the present embodiment, the instructions permitted under the supervisor mode are the supervisor instructions and the user instructions. However, the AV instructions may also be permitted.

AV mode monitoring unit 157 is included in microprocessor 371. However, AV mode monitoring unit 157 may be achieved in another construction. A signal line, For example, is formed to output the operation mode of microprocessor 371 externally and an external circuit is formed to compare the value of the signal line with the operand address output from microprocessor 371 and with the value stored in area management register 156.

*5. Fifth Embodiment

The image information processing system of the fifth embodiment is described below, the system being characterized by encrypting of a program itself and limiting of accesses to a specific data memory.

*5.1 Construction of Image Information Processing System

Figure 23:
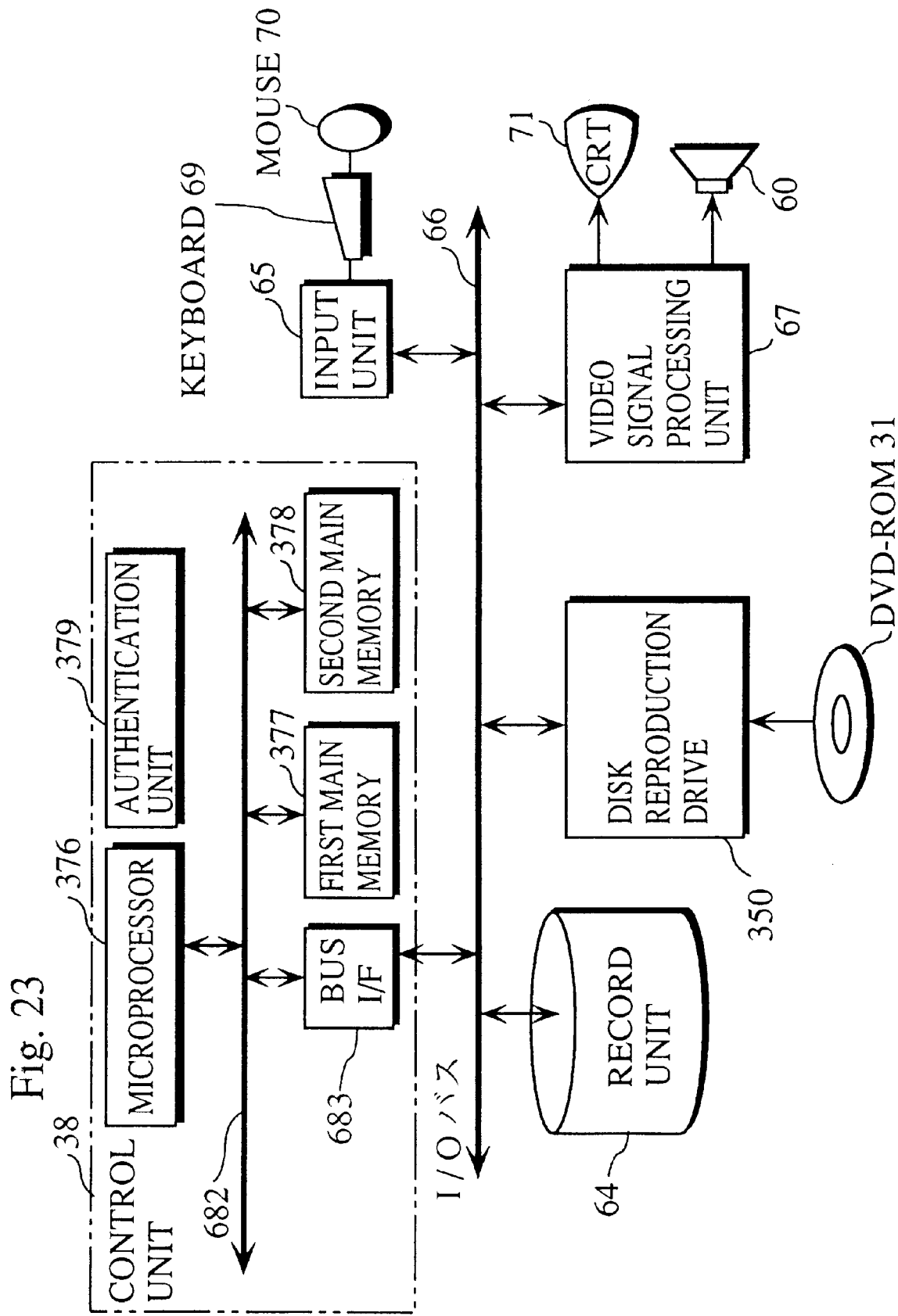
FIG. 23 is a block diagram showing the construction of the image information processing system of the fifth embodiment.

FIG. 23 is a block diagram showing the construction of the present image information processing system.

The construction of the present image information processing system of the fifth embodiment is basically the same as that of the first embodiment other than disk reproduction drive 350 and control unit 38 respectively replacing disk reproduction drive 35 and control unit 37 of the first embodiment.

*5.1.1 Disk Reproduction Drive 350

Figure 24:
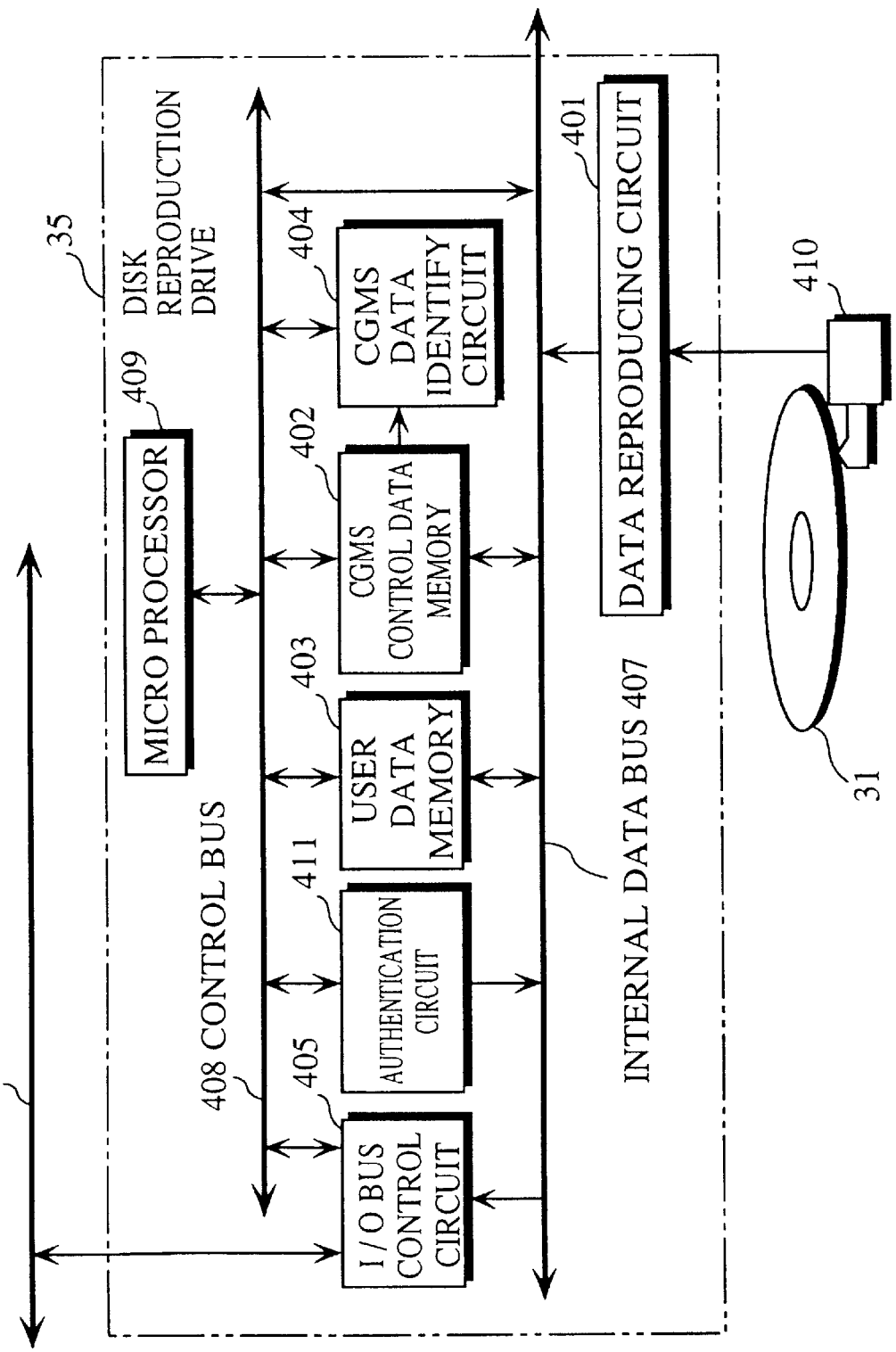
FIG. 24 is a block diagram showing the construction of disk reproduction drive 350.

FIG. 24 is a block diagram showing the construction of disk reproduction drive 350.

Disk reproduction drive 350 is basically the same as disk reproduction drive 35 of the first embodiment other than authentication circuit 411 replacing encryption circuit 406.

Authentication circuit 411 judges, before data is transferred between disk reproduction drive 350 and a partner apparatus, whether the partner apparatus is a formal apparatus permitted to process AV data. More specifically, authentication circuit 411 converts an authentication code sent from the partner apparatus into a value and judges whether the value matches a value prestored internally. If matches, authentication circuit 411 authenticates the partner apparatus as the formal apparatus and notifies microprocessor 409 of the authentication result.

Microprocessor 409 does not output the AV data to I/O bus 66 unless it receives a notification of authentication success from authentication circuit 411.

The secret key data and the conversion algorithm used to generate such a successful authentication code are provided in advance for predetermined apparatuses.

As is described above, disk reproduction drive 350 of the present embodiment makes a judgement for the authentication before AV data is transferred. Accordingly, disk reproduction drive 350 does not encrypt AV data, while disk reproduction drive 35 of the first embodiment does.

*5.1.2 Control Unit 38

Control unit 38, as shown in FIG. 23, includes microprocessor 376, authentication unit 379, processor bus 682, bus I/F 683, first main memory 377, and second main memory 378. Of these, microprocessor-376, authentication unit 379, first main memory 377, and second main memory 378 are not included in control unit 37 of the first embodiment, which is apparent from the comparison between FIGS. 3 and 23.

*5.1.2.1 Authentication Unit 379

Authentication unit 379 is a circuit having the secrep key data and the conversion algorithm required by disk reproduction drive 350 to authenticate a formal apparatus and generates a formal authentication code according to an instruction from microprocessor 376.

*5.1.2.2 First Main Memory 377

First main memory 377 is a memory accessed by microprocessor 376 by means of address specification and stores program sets each of which includes a plurality of instruction codes.

Figure 25:
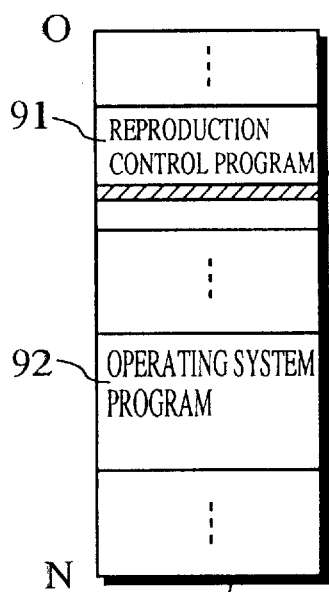
FIGS. 25(a)–(c) show the program sets loaded into first main memory 377.
FIG. 25(d) shows the contents of the instructions stored in first main memory 377.
Figure 25:
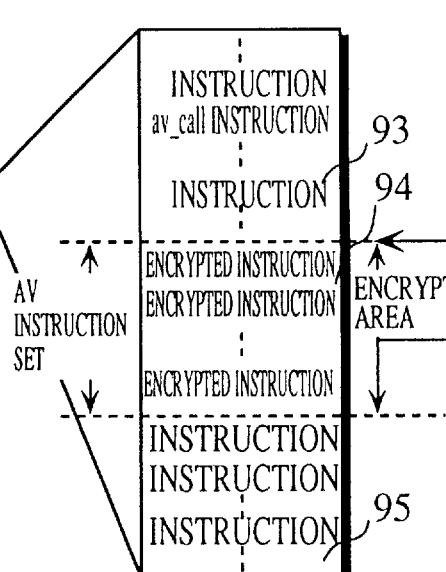
Figure 25:
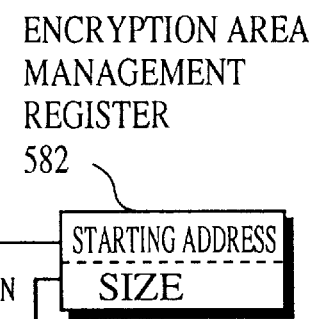
Figure 25:
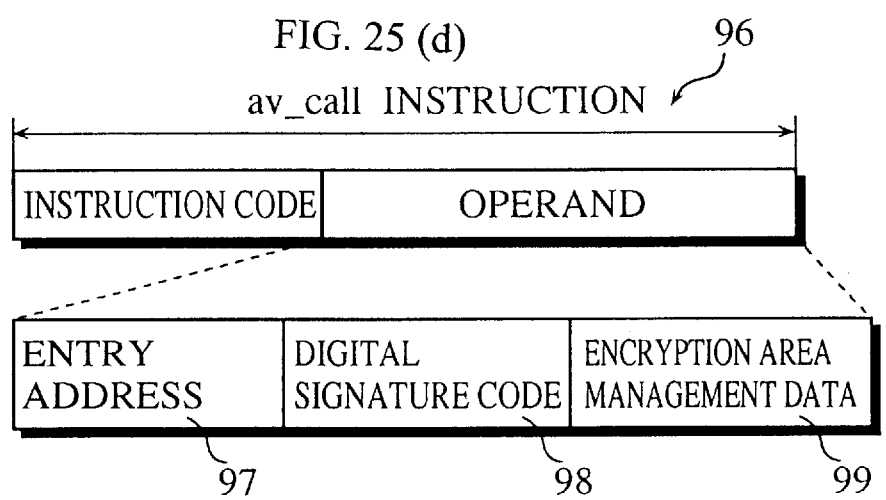

FIGS. 25(a)–(c) show the program sets loaded into first main memory 377.

As shown in FIG. 25(a), first main memory 377 stores reproduction control program 91 and operation system program 92.

Reproduction control program 91 controls the image information processing system, reproduces DVD-ROM 31, allows display apparatus 71 to output images and allows speaker 60 to output voices. Operation system program 92 controls the user program and lets the user program activate a program, manages the task, operates the files, etc. The programs 91 and 92 are comprised of a plurality of instruction codes which are decoded and executed by the microprocessor.

As shown in FIG. 25(b), reproduction control program 91 includes encryption area 94 in which instruction codes are encrypted and non-encryption areas 93 and 95 in which instruction codes are not encrypted. The instructions (encrypted instructions) prestored in encryption area 94 are instruction codes that have been encrypted by a compiler with encryption function "Encryp( )" in units of four bytes.

In the above encryption, each instruction is independently encrypted and order of the instructions is not changed by a shuffle. Accordingly, branch target addresses of the branch instructions are correct and target instructions can be fetched correctly by the addresses though each instruction has been encrypted.

Encryption area 94 also stores AV instructions which are instruction code sets (hereinafter called "encryption AV programs") that access the data mainly loaded into second main memory 381. Non-encryption areas 93 and 95 store the encryption AV program call instruction (the av_call instruction) which an entry address for encryption area 94 as an operand. Note that these instructions are loaded as the present image information processing system is activated.

FIG. 25(d) shows the contents of AV instruction set call instruction 96 (the av_call instruction). The instruction has digital signature code 98 and encryption area management data 99 as well as entry address 97 as operands.

Encryption area management data 99 is related to the starting address and the size of encryption area 94. Encryption area management data 99 is stored in encryption area management register 582, which is described later, as shown in FIG. 25(c) when AV instruction set call instruction 96 is executed. That is, microprocessor 376 recognizes that encryption area 94 is included in the instruction code sets loaded in first main memory 377 by referring to encryption area management register 582.

Digital signature code 98 is used to judge whether the encryption instruction stored in encryption area 94 is a formal one and is equal to the code, so called the "signature," that authorizes the program creator.

The digital signature code 98 is an ID code of the program creator encrypted by using the generation function "Sign( )." Accordingly, the third person, who does not know the generation function "Sign( )," cannot forge the digital signature code 98. On the contrary, one who knows the the decode function "Verify( )," which is the inversed function of the generation function "Sign( )," can identify the program creator and confirm the authority of the program by confirming the ID code.

In the present embodiment, the size value of encryption area 94 is used as the ID code which is unique to the program. That is, the creator of DVD-ROM 31 can prove that the encryption instruction stored in encryption area 94 is a formal one by generating, in advance, digital signature code 98 with the size of encryption area 94 as the ID code and by using generation function "Sign( )" and including the code 98 into the av_call instruction 96. This makes it possible to detect a user program not having the formal digital signature code 98 or to detect an event in which the validity of reproduction control program 91 has been destroyed due to a modification of digital signature code 98 or reproduction control program 91.

*5.1.2.3 Second Main Memory 378

Second main memory 378 is a memory accessed by microprocessor 376 by means of address specification and stores the digital data output from disk reproduction drive 350. Note that the address specified by microprocessor 376 includes identication information for selecting either of first main memory 377 and second main memory 378.

*5.1.2.4 Microprocessor 376

Microprocessor 376 executes instruction codes loaded in first main memory 377 in sequence and controls the whole image information processing system.

*5.1.2.4.1 Construction of Microprocessor 376

Figure 26:
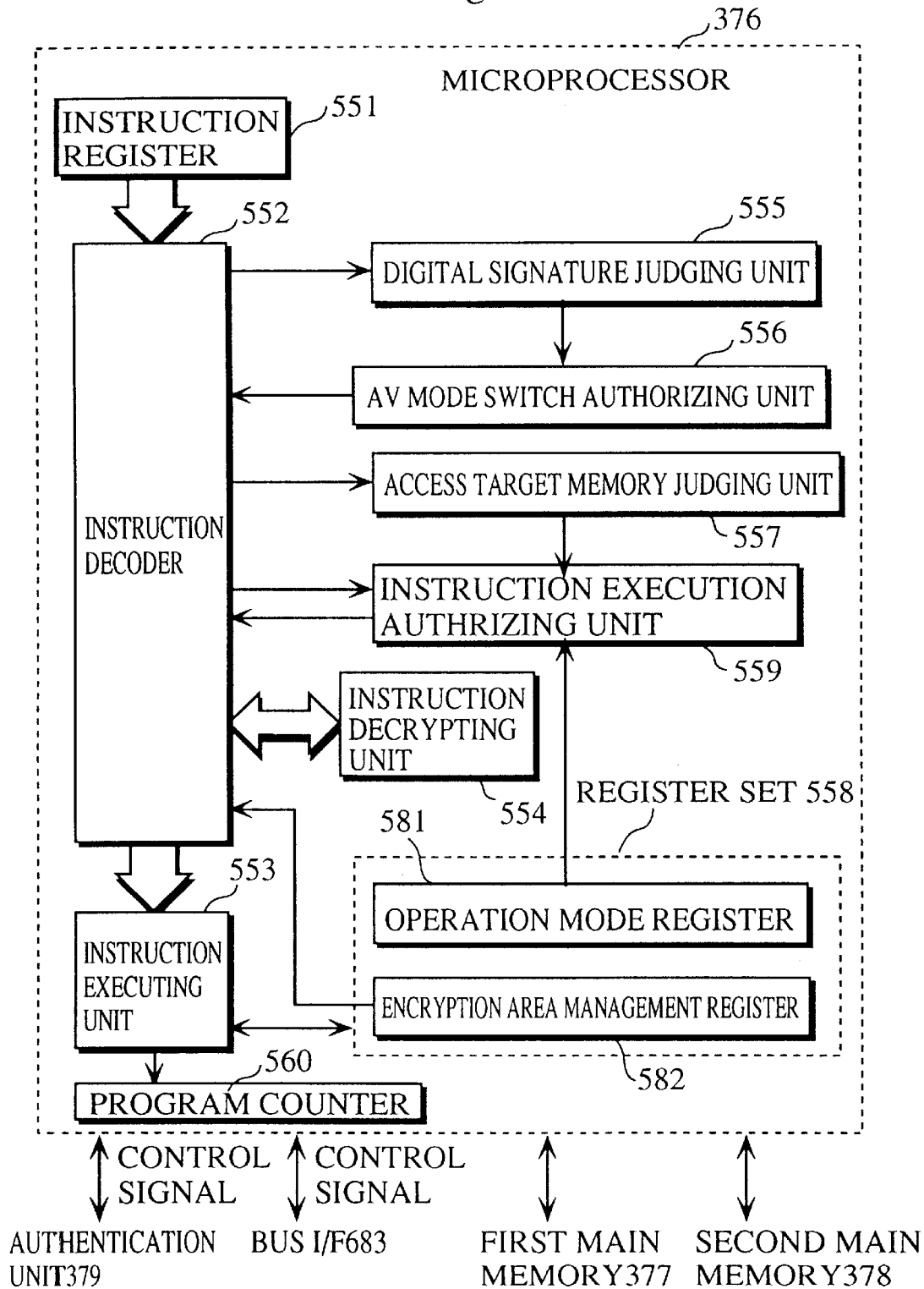
FIG. 26 is a block diagram showing the construction of microprocessor 376.

FIG. 26 is a block diagram showing the construction of microprocessor 376.

Microprocessor 376 is comprised of instruction register 551, instruction decoder 552, instruction executing unit 553, instruction decrypting unit 554, digital signature judging unit 555, AV mode switch authorizing unit 556, access target memory judging unit 557, instruction execution authrizing unit 559, register set 558, and program counter 560.

Instruction register 551 fetches an instruction from first main memory 377 from a location specified by the address value of program counter 560. The format of the instruction is the same as that of the fourth embodiment as shown in FIG. 19.

Note that after an instruction received by instruction register 551 is transferred to instruction decoder 552,. the next instruction is read from first main memory 377. This cycle is repeated until the end of the program.

Register set 558 stores and outputs a plurality pieces of data. Register set 558 includes operation mode register 581 and encryption area management register 582 as well as a general-purpose register used for calculations and the like (not shown in the drawings).

Operation mode register 581 has the same function as operation mode register 158 of the fourth embodiment.

Encryption area management register 582 stores the starting address and the size of encryption area 94.

Digital signature judging unit 555, responding to a request from instruction decoder 552, judges the authority of input digital signature code 98. More specifically, digital signature judging unit 555 compares a value obtained by converting digital signature code 98 by using inverse function "Verify( )" with the size of encryption area 94 stored in encryption area management register 582 and outputs "TRUE" if authorized by the judgement, "FALSE" if not. This is because digital signature code 98 is equal to a value obtained by converting the ID code (the size of encryption area 94) by using inverse function "Verify( )."

AV mode switch authorizing unit 556, on receiving signal "TRUE" from digital signature judging unit 555, outputs an authrization signal which authorizes instruction decoder 552 execute an instruction for switching the operation mode to the AV mode.

Access target memory judging unit 557 judges whether the address specified by instruction decoder 552 is of first main memory 377 or second memory 378 by referring to an identifier in the address and notifies the judgement result to instruction execution authrizing unit 559.

Instruction execution authrizing unit 559 judges whether the execution of the instruction fetched by instruction decoder 552 is authorized by referring to the operation mode of operation mode register 581 and the judgement result sent from access target memory judging unit 557. If authorized, instruction execution authrizing unit 559 outputs an authorization signal to instruction decoder 552.

The above judgement is divided into two stages. At the first stage, instruction execution authrizing unit 559 judges whether a privilege infringement occurs by judging whether the current operation mode allows the instruction fetched by instruction decoder 552 to be executed. Instruction execution authrizing unit 559 does not authorize the execution of the instruction if a privilege infringement occurs, that is, if the RESET or STOP instruction is executed under the user mode, for example. At the second stage, instruction execution authrizing unit 559 authorizes the execution of the instruction only when the instruction is to access second main memory 378 and the current operation mode is the AV mode. That is programs other than reproduction control program 91, which is executed under the AV mode, are prohibited from accessing second main memory 378.

Instruction decrypting unit 554, including a circuit for executing decryption function "Decrypt( )" or an inversed function of encryption function "Encrypt( )," decrypts an encrypted instruction output from instruction decoder 552 and returns the decrypted instruction to instruction decoder 552.

Instruction decoder 552 decodes the instruction stored in instruction register 551 and outputs, in the order of decoded executions, addresses obtained through the decoding to instruction executing unit 553 having microprograms.

Instruction decoder 552 also judges whether the execution of the instruction is authorized before the execution. More specifically, instruction decoder 552 outputs a privilege level required for the execution of the decoded instruction to instruction executing unit 553. If the decoded instruction requires an access to a main memory, instruction decoder 552 outputs the operand of the instruction specifying the address of the access-target main memory to access target memory judging unit 557. Instruction decoder 552, on receiving the authorization signal from instruction execution authorizing unit 559, starts controlling instruction executing unit 553 so that the instruction is executed; performs a certain error handling process without executing the instruction if it does not receive the authorization signal.

Instruction decoder 552, on decoding the av_call instruction, outputs digital signature code 98, which is an operand of the instruction, to digital signature judging unit 555, as well as judging as above. Instruction decoder 552 then executes the av_call instruction if it receives the authorization signal from AV mode switch authorizing unit 556. When the av_call instruction is executed, information on encryption area 94 included in reproduction control program 91 is stored in encryption area management register 582, as described earlier. Therefore, instruction decoder 552 judges whether the instruction to be decoded is the instruction having been stored in encryption area 94 by referring to encryption area management register 582. If judged as an encrypted instruction, the instruction is decrypted by instruction decrypting unit 554 then is decoded and executed.

Instruction executing unit 553, having a plurality of microprograms, outputs a microcode when the address of the microcode is output from instruction decoder 552.

FIG. 27 shows a table stored in instruction executing unit 553 showing the relation between instructions and privilege levels required to execute the instructions.

In the present embodiment, the STOP and RESET instructions are allowed to be executed under the superviser mode, and the read_av instruction, which is used to read AV data after obtaining an authorization from disk reproduction drive 350 and load image data into second main memory, is defined as the AV instruction.

The following is the description of major instructions which are executed when MPEG data stored in DVD-ROM 31 is reproduced as images.

*5.1.2.4.1.1 av call instruction

The av_call instruction, being a user instruction, is a branch instruction for branching control by microprocessor 376 to the AV instruction set in reproduction control program 91 stored in encryption area 94.

When the av_call instruction is executed, various status values in register set 558 including operation mode register 581 are saved into the save memory in second main memory 378.

The av_call instruction then changes the operation mode to the AV mode by updating operation mode register 581 and stores the size and the starting address of encryption area 94 into encryption area management register 582.

The av_call instruction then saves the address from program counter 560 to the save memory of second main memory 378 and stores the entry address of the corresponding encryption AV program, which is included an operand of the instruction, into program counter 560.

The above operation allows control to branch to an encrypted AV program stored in encryption area 94 to continue the execution.

In the encrypted AV program of the present embodiment, the following instructions are executed: the read_av instruction for reading digital data from an optical disk; a variety of calculation instructions for decoding the read digital data with MPEG decoding; and the write instruction for transferring the decoded image and voice data to video signal processing unit 67. The av_return instruction for returning from the AV mode is executed after the reproduction of the encrypted AV program completes.

*5.1.2.4.1.2 read_av instruction

The read_av instruction is authorized to be executed only under the AV mode. The read_av instruction outputs the AV data read instruction (dsk_read_av) to disk reproduction drive 350, instructs authentication unit 379 to perform the authentication process with disk reproduction drive 350, and loads the AV data from disk reproduction drive 350 to second main memory 378.

The MPEG data loaded into second main memory 378 in the above process is converted into image data and voice data after a combination of microprograms are executed for certain calculations for decompressing under MPEG. The image and voice data are stored in first main memory 377. The certain calculations include an inverse DCT conversion and the like.

*5.1.2.4.1.3 write instruction

The write instruction, being a user instruction, outputs the write instruction and digital data to a specified apparatus by controlling bus I/F 683. The write instruction transfers the image and voice data decompressed under MPEG to video signal processing unit 67.

*5.1.2.4.1.4 av return instruction

The av_return instruction is a branch instruction for letting control return from the AV mode.

When program counter 560 specifies the av_return instruction as an instruction to be executed, the status information and address saved in the save memory of second main memory 378 are returned to register set 558 and program counter 560. This lets control return to the state immediately before the execution of the av_call instruction. The operation mode of the microprocessor also changes from the AV mode to either of the supervisor mode or user mode since the previous operation mode returns to operation mode register 581.

*5.1.2.4.2 Operation of Microprocessor 376

Now, the operation of microprocessor 376 is described.

Instruction register 551 fetches an instruction of reproduction control program 91 from first main memory 377.

Instruction decoder 552 reads the instruction from instruction register 551 and decrypts the instruction if instruction decoder 552 judges, by referring to encryption area management register 582, that the instruction has been stored in encrypted area 94.

Instruction execution authorizing unit 559 judges whether the execution of the instruction, as it is or decrypted, has been authorized. For the av_call instruction, AV mode switch authorizing unit 556 outputs a signal indicating either of "authorized" or "not authorized."

Instruction decoder 552 decodes the instruction and outputs the addresses of corresponding microprograms to instruction executing unit 553 if the execution of the instruction has been authorized.

Instruction decoder 552 stops the execution of the instruction and peforms a certain error handling process if the execution of the instruction has not been authorized.

Instruction executing unit 553, on receiving the addresses of the microprograms, runs the specified microprograms and completes the instruction by executing calculations or outputting control signals to bus I/F 683 and authentication unit 379 according to the microprograms.

*5.2 Operation of Image Information Processing System

Now, the operation of the present image information processing system constructed as above is described.

DVD-ROM 31 is reproduced by running reproduction control program 91 loaded in first main memory 377 of control unit 38.

When reproduction control program 91 is run, control unit 38 determines the AV file on DVD-ROM 31 to be reproduced. When the AV file is determined, operating system program 92 loaded in first main memory 377 calculates the address of the sector on DVD-ROM 31 in which the determined AV file is stored.

After the sector address of the AV file is determined, control unit 38 executes the av_call instruction of reproduction control program 91. During the execution of the instruction, control unit 38 changes the operation mode of the microprocessor from the user mode to the AV mode. Control unit then saves the status information, which indicates the current execution status of the microprocessor, to the save memory in second main memory 378 including the execution address value of program counter 560, stores the entry address of the encryption AV program into program counter 560, and moves control to the encryption AV program.

In the above process, control unit 38 judges whether the encryption AV program has been authorized by checking digital signature code 98 included in the av_call instruction as an operand. Control unit 38 changes the operation mode to the AV mode only when it judges the encryption AV program authorized. If not authorized, control unit 38 performs an error handling process without executing the encryption AV program.

During the execution of the AV program under the AV mode, the av_read instruction is executed. The av_read instruction lets control unit 38 output the AV data read instruction (AV_dsk_read) to disk reproduction drive 350.

Disk reproduction drive 350, on receiving the AV_dsk read instruction, receives the authentication code from control unit 38 and performs an authentication process by using the code.

If the authentication succeeds, disk reproduction drive 350 reads and outputs AV data. Note that disk reproduction drive 350 judges whether the digital data to be read is AV data by checking the sector header area of sector 10, in the same way as the first embodiment. As a result, disk reproduction drive 350 prohibits the digital data from being output if the AV data read instruction (AV_dsk_read) is not issued for requesting to read AV data or the authentication fails.

The AV data read from disk reproduction drive 350 with the AV data read instruction (AV_dsk_read) is loaded into second main memory 378 of control unit 38.

Control unit 38 continues the execution of the AV program under the AV mode and converts the AV data in second main memory 378 into image and voice data by decompressing the AV data under MPEG.

Control unit 38 continues the execution of the AV program under the AV mode and transfers the obtained image and voice data from second main memory 378 to video signal processing unit 67 to output the data as images and voices.

Control unit 38 continues the execution of the AV program under the AV mode to repeat the above procedure, namely, reading AV data from DVD-ROM 31, decoding, and outputting images and voices.

After the reproduction of the AV data completes, the av return instruction of the encryption AV program is executed. The av_return instruction returns the status information including the address and operation mode saved in the save memory of second main memory 378 to register set 558 and program counter 560. This lets control return to the state immediately before the change to the AV mode.

*5.3

As is described above, in the present embodiment, the AV data stored in DVD-ROM 31 is read only by a formal reproduction control program 91 which inseparably execute reading and reproducing. This prevents a malfunction or an illegal action where AV data read from DVD-ROM 31 by a user program other than reproduction control program 91 is used without being reproduced.

Control unit 38 includes second main memory 378 dedicated to AV data (digital data). Accesses to second main memory 378 by user programs operating under the user mode are not permitted since second main memory 378 is protected by the operation mode of microprocessor 376 (AV mode). This prevents a malfunction where a user program is used to record the AV data into a hard disk apparatus and the like as a secondary storage.

Reproduction control program 91 for reproducing data in DVD-ROM 31 is stored in first main memory 377 after being encrypted. Accordingly, it is virtually impossible for one who does not know the information required for the encryption to modify reproduction control program 91. This also prevents a malfunction where a modified reproduction control program 91 is used to record the AV data into a hard disk apparatus and the like as a secondary storage.

Encrypted programs also include digital signature code 98 with which the authority of the programs may be confirmed. It is possible to judge whether a program is an encrypted program whose operation is authorized by checking the digital signature code 98. This prevents a runaway of microprocessor 376 due to the execution of an incorrect encrypted program.

Disk reproduction drive 350 reads AV data from DVD-ROM 31 and outputs the read data to control unit 370 when control unit 370 executes the read_av instruction, which is the AV instruction. This prevents a malfunction or an illegal action where a user program running under the user mode issues a request directly to disk reproduction drive 350 to read AV data.

The present embodiment provides the dsk_read_av instruction which is dedicated to instructing disk reproduction drive 350 to read AV data from DVD-ROM 31 and allows the read AV data to be stored directly into second main memory 378. However, there may be used another method other than the dsk read_av instruction to prevent an illegal action where the AV data is extracted by using a user program and the like before the AV data is stored in the second main memory.

It is possible, for example, to invalidate the reading of AV data by the user program by encrypting the AV data of DVD-ROM 31. In this case, an instruction is required for decrypting the encrypted AV data. The instruction may be defined as the AV instruction so that the instruction cannot be used by the user program. There another option for preventing the above problem. That is, such a decryption instruction may be defined as the user instruction and the data decrypted by the decryption instruction may be output only to second main memory 378.

For any of the above cases, encrypting of AV data before the AV data is transferred through I/O bus 66 makes it unnecessisary to judge whether the data output by disk reproduction drive 350 is AV data or to limit the output destination. This will eliminate the necessity of CGMS data identify circuit 404 for identifying AV data.

It is needless to say that an encryption algorithm with a public key under RSA (Rvest Shamir Adlemann) instead of DES may also be adopted as a conversion algorithm to be included in authentication circuit 411 and authentication unit 379.

In the present embodiment, encryption area 94 of reproduction control program 91 is encrypted in units of four bytes and the order of the instructions is not changed by a shuffle. However, another encryption method may be adopted as far as the encrypted program area can be executed by the microprocessor. Encryption in units of certain bytes other than four bytes, for example, is possible as far as the encryption is done for each instruction. In this case variable-length encryption corresponding to variable-length instruction may be performed. In this case, however, the size of encryption length should be stored in the header unit which is not encrypted, the header unit being formed in each instruction.

Concerning with the encryption in which order of the instructions is not changed by a shuffle, there are other methods. A dynamic parameter specific to the encryption program area such as the size of the encryption program area, for example, may be used as a parameter in encryption function "Encrypt( )." This improves the safety since the encryption program areas include different encrypted codes, though the encryption program areas may have the same instructions.

An encryption in which order of the instructions is changed by a shuffle may also be adopted. In this case, a third main mamory, which cannot be accessed by user programs, may be formed for the decryption. The third main memory may decrypt collected encrypted programs at once. The decrypted instructions then may be read into instruction register 551 in sequence. As another option, an address after the shuffle may be specified as the branch destination address by an assembler or a linkage unit.

In the present embodiment, reproduction control program 91 performs, under an AV program, a series of processes: reading of AV data from DVD-ROM 31, decoding of the read AV data with MPEG decoding, and transferring of decoded image and voice data to video signal processing unit 67. However, reproduction control program 91 may have other contents as far as instructions required to access second main memory 378 are executed under the AV mode. It is needless to say that each process may be executed by an independent AV program. In this case, however, reproduction control program 91 includes a plurality of programs to be stored in encryption area 94.

In the present embodiment, control unit 38 uses a component for calculation included in the microprocessor to perform calculations. However, a specific calculation set frequently used in the decoding may be achieved in the microprocessor as a dedicated circuit if the microprocessor does not have an enough calculation power. As another option, a dedicated circuit, such as a DSP, for assisting MPEG decoding may be achieved as a peripheral chip of the microprocessor.

A circuit for issuing the AV data read instruction to disk reproduction drive 350 may be formed independently. A signal line indicating the operation mode of the microprocessor then may be input to the circuit so that the instruction is issued only when the microprocessor is in the AV mode.

In the present embodiment, first and second main memories are achieved as physically different memory units. However, one memory unit may be used as two logically different units by having independently a memory area management register for AV data which manages the momory space and defines the memory space being equal to second main memory 378. In this case, the memory area management register for AV data may be accessed only under the AV mode. Under other operation modes, it should only be possible to refer to the memory area management register. Furthermore, if an active value is not set in the memory area management register for AV data after the operation mode changes to the AV mode, the microprocessor will be required to search and assign an unused memory space for the operation under the AV mode.

In the present embodiment, instruction decrypting unit 554, digital signature judging unit 555, AV mode switch authorizing unit 556, access target memory judging unit 557, and instruction execution authrizing unit 559 are included in the microprocessor. However, it is needless to say that these units may be achieved as the circuits outside the microprocessor.

In the present embodiment, authentication unit 379 is formed as a circuit outside the microprocessor in control unit 38. However, authentication unit 379 may be included in the microprocessor. Another option relating to this is not to use such a circuit and to allow microprocessor 376 to execute a special program which can only be used by a program for reproducing images.

In the present embodiment, only the microprocessor can access the main memory. However, with a construction including a dedicated apparatus such as a DMA controller or a DSP, illegal data transfers where second main memory 378 is accessed under an operation mode other than the AV mode may be prohibited by checking the operation mode before data is transferred by the dedicated apparatus.

In the present embodiment, encryption area management register 582 stores the starting address and the size of encryption area 94. However, a pair of the starting and ending addresses, or common bits starting from MSB (Most Significant Bit) in the address in the AV data area, may replace the pair of the starting address and the size.

In the present embodiment, the execution of an instruction is stopped and a certain error handling process is executed when the execution of the instruction has not been permitted. However, the operation may be executed as a "no operation" (nop) instruction instead of the error handling process to prohibit the access.

Reproduction control program 91 of the present embodiment may be provided by DVD-ROM 31 with the AV data. In this case, reproduction control program 91 is read from DVD-ROM 31 and loaded into first main memory 377. In this case, reproduction control program 91 may become unique to each application if the AV data is encrypted with an encryption key which is unique to each application and reproduction control program 91 has a key for decrypting the encryption. This makes the security level tighter.

For each of the above embodiments, video signal processing unit 67 may be achieved as a removable card-type apparatus that includes a connection unit for connecting the unit to I/O bus 66 and is attached to an extended card box of the present image information processing system. In this case, video signal processing unit 67 is called a video card.

In all the above embodiments, video signal processing unit 67 includes a graphics generation function and a image combination function. However, the image combination function may be achieved as a video combination unit as an external element.

In all the above embodiments, DVD-ROMs are used as information record mediums. However, other information record mediums such as CD-ROMs, magnetic disks, and magnet-optical disks may be used instead of DVD-ROMs as far as the information record area is managed in units of sectors and the sectors can be managed by a filing system.

In all the above embodiments, disk reproduction drive 35 is used to read digital data from DVD-ROM 31. However, other apparatuses may be used instead of disk reproduction drive 35 as far as the apparatuses can read digital data including image information and can read image idenfication information which indicates whether the digital data is image information. Such apparatuses may be, for example, apparatuses which read such digital data through broadcast and communication lines such as digital broadcast by the satellite broadcast. In this case, the data reading means is a receiver that receives digital broadcast. The digital data may also be read via internet, which uses the CATV line or the telephone line. In this case, the data reading means is a receiver. In data transfers through broadcast or communication lines, the digital data is transferred in units of packets. In this case, the image identification information is included in the packet header area which is the header area of the packet.

In all the above embodiments, hard disk apparatus 64 may be replaced with another apparatus such as a magnet-optical disk apparatus, a magnetic tape apparatus, and a phase-change-type DVD-RAM apparatus as far as the digital data is recorded in the apparatus.

What is claimed is:

1. A microprocessor for executing an instruction loaded in a memory, the microprocessor comprising:

instruction fetch means for fetching the instruction from the memory;

instruction decode means for decoding the instruction fetched by the instruction fetch means, wherein the instruction includes an AV data reproduce instruction; and execute means for executing the instruction decoded by the instruction decode means;

wherein the execute means comprises:

an AV data reproduce unit for, when the instruction decode means decodes the AV data reproduce instruction, inseparably executing a process of storing compressed AV data into the memory and a process of decompressing the compressed AV data extracted from the memory; and operation mode storage means for storing an operation mode, wherein the operation mode is either of a first operation mode under which all kinds of instructions may be executed and a second operation mode under which certain kinds of instructions may be executed, wherein the instruction decoded by the instruction decode means includes an AV data store instruction and an AV data decompress instruction;

wherein the instruction decode means decodes the AV data store instruction only when the mode storage means stores the first operation mode;

wherein the execute means farther comprises:

a storage unit for performing the process of storing compressed AV data into the memory when the instruction decode means decodes the AV data store instruction; and a decompress unit for performing the process of decompressing the compressed AV data when the instruction decode means decodes the AV data decompress instruction, wherein the AV data reproduce unit updates the operation mode of the operation mode storage means to the first operation mode before performing the process of storing compressed AV data into the memory and the process of decompressing the compressed AV data respectively based on the AV data store instruction and the AV data decompress instruction.

2. The microprocessor of claim 1, wherein the instruction decoded by the instruction decode means includes an AV data read instruction and an AV data decrypt instruction, wherein the execute means further comprises:

a read unit for reading encrypted compressed AV data from an external apparatus when the instruction decode means decodes the AV data read instruction; and a decrypt unit for decrypting the encrypted compressed AV data when the instruction decode means decodes the AV data decrypt instruction, wherein the AV data reproduce unit performs the process of reading encrypted compressed AV data and the process of decrypting the encrypted compressed AV data respectively based on the AV data read instruction and the AV data decrypt instruction before performing the process of storing compressed AV data into the memory.

3. An image information processing system as recited in claim 2 comprising:

an AV data read apparatus for reading digital data from an external medium, encrypting the digital data if the digital data is compressed AV data, and outputting the encrypted compressed AV data;

an AV output apparatus for receiving image data and voice data, converting the image data and voice data respectively into an image signal and a voice signal, and displaying an image and outputting a voice;

a control apparatus, comprising the microprocessor and the memory for converting the encrypted compressed AV data output from the AV data read apparatus into the image data and the voice data and transferring the image data and the voice data to the AV output apparatus.

4. A microprocessor for executing an instruction loaded in a memory, the microprocessor comprising:

instruction fetch means for fetching the instruction from the memory;

instruction decode means for decoding the instruction fetched by the instruction fetch means;

wherein the instruction includes an AV data read instruction, wherein the instruction decode means comprises a privilege infringement monitor unit for judging whether a privilege infringement has occurred if the instruction fetched by the instruction fetch means is the AV data read instruction, and stoping decoding of the AV data read instruction if the privilege infringement monitor unit judges that the privilege infringement has occurred; and execute means for executing the instruction decoded by the instruction decode means, wherein the execute means comprises:

an AV data read unit for, when the instruction decode means decodes the AV data read instruction, reading compressed AV data from an external medium and storing the read compressed AV data into the memory.

5. The microprocessor of claim 4, wherein the privilege infringement monitor unit, comprising an operation mode storage unit for storing information specifying a current operation mode of the microprocessor, judges that the privilege infringement has not occurred if the instruction fetched by the instruction fetch means is the AV data read instruction and if the information stored in the operation mode storage unit specifies an operation mode under which only instructions for processing AV data may be executed.

6. A microprocessor for executing an instruction loaded in a memory, the microprocessor comprising:

instruction fetch means for fetching the instruction from the memory;

instruction decode means for decoding the instruction fetched by the instruction fetch means;

wherein the instruction includes an AV data read instruction, wherein the instruction decode means comprises a privilege infringement monitor unit for judging whether a privilege infringement has occurred if the instruction fetched by the instruction fetch means is the AV data read instruction, and stopping the decoding of the AV data read instruction if the privilege infringement monitor unit judges that the privilege infringement has occurred; and wherein the privilege infringement monitor unit includes an operation mode storage unit for storing information specifying a current operation mode of the microprocessor and said privilege infringement monitor judges that the privilege infringement has not occurred if the instruction fetched by the instruction fetch means is the AV data read instruction and if the information stored in the operation mode storage unit specifies an operation mode under which only instructions for processing AV data is executed;

execute means for executing the instruction decoded by instruction decode means, wherein the execute means comprises:

an AV data read unit for, when the instruction decode means decodes the AV data read instruction, reading compressed AV data from an external medium and storing the read compressed AV data into the memory; and wherein the instruction decoded by the instruction decode means further includes an AV data transfer instruction, wherein the execute means further comprises a transfer unit for, if the instruction decode means decodes the AV data transfer instruction, transferring the compressed AV data from the memory to a specified location, wherein the execute means further comprises:

an area storage unit for storing information which specifies a predetermined AV data area of memory; and an access area monitor unit for judging whether the specified location is in the predetermined AV data area by referring to an address of the specified location and stopping the transferring of the compressed AV data to the specified location.

7. The microprocessor of claim 6, wherein the access area monitor unit stops transferring of the compressed AV data by cutting an output of an address signal output by the microprocessor.

8. An image information processing system as recited in claim 7 comprising:

an AV data read apparatus for reading digital data from an external medium, encrypting the digital data if the digital data is compressed AV data, and outputting the encrypted compressed AV data;

an AV output apparatus for receiving image data and voice data, converting the image data and voice data respectively into an image signal and a voice signal, and displaying an image and outputting a voice;

a control apparatus, comprising the microprocessor and the memory for converting the encrypted compressed AV data output from the AV data read apparatus into the image data and the voice data and transferring the image data and the voice data to the AV output apparatus.

9. An image information processing system comprising:

a first storage means for storing a reproduction control program for reproducing compressed AV data, wherein the reproduction control program includes a set of encrypted instructions and a set of not-encrypted instructions, wherein each of the encrypted instructions includes an instruction for dealing with the compressed AV data and each of the not-encrypted instructions includes a call instruction for moving an execution control to an encrypted instruction; and a microprocessor which comprises execute means for executing an instruction stored in the first storage means, wherein the execute means comprises:
- an execution prohibit unit for prohibiting the call instruction from being executed based on a signature code included in the call instruction; and
- a decrypt unit for decrypting the set of encrypted instructions before the set of encrypted instructions are executed.

10. The image information processing system of claim 9, wherein the execution prohibit unit judges whether an instruction to be executed generates a privilege infringement and prohibits the instruction from being executed if the execution prohibit unit judges that the instruction generates the privilege infringement.

11. The image information processing system of claim 10 further comprising
- second storage means,
- wherein the microprocessor further comprises an operation mode storage unit for storing information specifying a current operation mode of the microprocessor,
- wherein the execution prohibit unit prohibits the instruction from being executed if the instruction is to access the second storage means and if the information stored in the operation mode storage unit specifies an operation mode under which instructions for processing AV data are prohibited from being executed.

12. The image information processing system of claim 11 further comprising:
- an AV data read apparatus for reading compressed AV data from an external medium and outputting the compressed AV data;
- an AV output apparatus for receiving image data and voice data, converting the image data and voice data respectively into an image signal and a voice signal, and displaying an image and outputting a voice;
- wherein the microprocessor, based on the reproduction control program, converts the compressed AV data output from the AV data read apparatus into the image data and the voice data and transferring the image data and the voice data to the AV output apparatus.

13. A system for reading and displaying AV signals from a medium storing AV data while inhibiting unauthorized reproduction of AV data stored on said medium comprising:
- an AV reading unit for reading said AV data from said medium, said AV reading unit encrypting said AV data and storing control information in an unencrypted state;
- a microprocessor connected to said AV reading unit and receiving said encrypted AV data and said control information, said microprocessor adapted to write the encrypted AV data to a memory location connected to said microprocessor, and said microprocessor upon a request to extract said stored encrypted AV data further adapted to a) read said compressed AV data from said memory, b) decrypt said compressed AV data, and c) decompress said compressed AV data in a series of inseparable, consecutive operations; and
- a digital to analog converter for converting the decompressed, decrypted AV data from said microprocessor to AV signals corresponding to said AV data; and
- display means for displaying said AV signals.

* * * * *